US010739985B2

(12) United States Patent
Matsubara

(10) Patent No.: US 10,739,985 B2
(45) Date of Patent: Aug. 11, 2020

(54) COMPUTER-READABLE STORAGE MEDIUM HAVING STORED THEREON DISPLAY CONTROL PROGRAM, DISPLAY CONTROL SYSTEM, DISPLAY CONTROL APPARATUS, AND DISPLAY CONTROL METHOD

(75) Inventor: Yasushi Matsubara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1074 days.

(21) Appl. No.: 12/984,944

(22) Filed: Jan. 5, 2011

(65) Prior Publication Data

US 2012/0066621 A1    Mar. 15, 2012

(30) Foreign Application Priority Data

Sep. 14, 2010 (JP) .................................. 2010-205845

(51) Int. Cl.
*G06F 3/0488* (2013.01)
*G06F 3/0485* (2013.01)
*A63F 13/53* (2014.01)

(52) U.S. Cl.
CPC ............ *G06F 3/0488* (2013.01); *A63F 13/53* (2014.09); *G06F 3/0485* (2013.01); *A63F 2300/6653* (2013.01)

(58) Field of Classification Search
CPC ...... G06F 3/048; G06F 3/0488; G06F 3/0482; G06F 3/0485
USPC .................. 715/764, 768, 817, 833; 345/173
See application file for complete search history.

(56) References Cited

U.S. PATENT DOCUMENTS

| 5,657,049 | A | * | 8/1997 | Ludolph et al. ............... 715/856 |
| 5,726,669 | A | * | 3/1998 | Obata et al. .................... 345/2.2 |
| 5,821,930 | A | * | 10/1998 | Hansen .......................... 715/702 |
| 6,476,831 | B1 | * | 11/2002 | Wirth et al. ................... 715/784 |
| 7,000,181 | B2 | * | 2/2006 | Press ............................... 715/212 |
| 8,351,989 | B2 | * | 1/2013 | Ahn et al. ...................... 455/566 |
| 2001/0053715 | A1 | * | 12/2001 | Adachi et al. .................. 463/30 |
| 2004/0165010 | A1 | * | 8/2004 | Robertson ............. G06F 3/0481 715/805 |
| 2005/0149347 | A1 | * | 7/2005 | Chew ................................ 705/1 |
| 2006/0031776 | A1 | * | 2/2006 | Glein .................. G06F 3/04815 715/779 |
| 2007/0150830 | A1 | * | 6/2007 | Ording et al. ................. 715/784 |
| 2007/0240073 | A1 | * | 10/2007 | McCarthy et al. ............ 715/767 |
| 2008/0062207 | A1 | * | 3/2008 | Park .............................. 345/684 |
| 2008/0168349 | A1 | * | 7/2008 | Lamiraux ............ G06F 3/0482 715/702 |
| 2008/0168404 | A1 | * | 7/2008 | Ording .......................... 715/863 |
| 2008/0168478 | A1 | * | 7/2008 | Platzer et al. ................. 719/328 |

(Continued)

FOREIGN PATENT DOCUMENTS

JP       2000-66801        3/2000

*Primary Examiner* — Amy Ng
*Assistant Examiner* — William Wong
(74) *Attorney, Agent, or Firm* — Nixon & Vanderhye, P.C.

(57) ABSTRACT

First, a plurality of selection objects having at least one part thereof displayed on a display area of a display device are moved relative to the display area, based on an output signal outputted from an input device. Then, when an end-located selection object among the moved plurality of selection objects reaches a predetermined position of the display area, an object that is different from the plurality of selection objects is displayed on the display area. The object moves relative to the display area based on an output signal outputted from the input device.

22 Claims, 15 Drawing Sheets

(56) References Cited

U.S. PATENT DOCUMENTS

| | | | |
|---|---|---|---|
| 2008/0207188 A1* | 8/2008 | Ahn et al. | 455/418 |
| 2009/0070711 A1* | 3/2009 | Kwak et al. | 715/829 |
| 2009/0077488 A1* | 3/2009 | Ording | 715/784 |
| 2009/0094562 A1* | 4/2009 | Jeong et al. | 715/863 |
| 2009/0106702 A1* | 4/2009 | Park et al. | 715/841 |
| 2009/0228825 A1* | 9/2009 | Van Os et al. | 715/780 |
| 2009/0249247 A1* | 10/2009 | Tseng et al. | 715/808 |
| 2009/0319896 A1* | 12/2009 | Green et al. | 715/708 |
| 2010/0251153 A1* | 9/2010 | SanGiovanni et al. | 715/767 |
| 2010/0311445 A1* | 12/2010 | Kim | 455/466 |
| 2011/0001709 A1* | 1/2011 | Wang | 345/173 |
| 2011/0010659 A1* | 1/2011 | Kim et al. | 715/784 |
| 2011/0055752 A1* | 3/2011 | Rubinstein et al. | 715/784 |
| 2011/0107264 A1* | 5/2011 | Akella | 715/830 |
| 2011/0126148 A1* | 5/2011 | Krishnaraj | G06F 3/016 715/784 |
| 2011/0161892 A1* | 6/2011 | Hamadene | G06F 3/04845 715/863 |
| 2011/0202834 A1* | 8/2011 | Mandryk et al. | 715/701 |
| 2011/0265002 A1* | 10/2011 | Hong | G06F 3/04855 715/702 |
| 2012/0026181 A1* | 2/2012 | Wagner | G06F 3/0485 345/589 |

\* cited by examiner

COMPUTER-READABLE STORAGE MEDIUM HAVING STORED THEREON DISPLAY CONTROL PROGRAM, DISPLAY CONTROL SYSTEM, DISPLAY CONTROL APPARATUS, AND DISPLAY CONTROL METHOD

CROSS REFERENCE TO RELATED APPLICATION

The disclosure of Japanese Patent Application No. 2010-205845, filed on Sep. 14, 2010, is incorporated herein by reference.

BACKGROUND OF THE INVENTION

Field of the Invention

The present invention relates to a display control process conducted when displaying display-contents such as a selection object that is to be selected by a user and a content that is to be browsed by a user, and more specifically relates to a process conducted when scrolling the selection object and content.

Description of the Background Art

An information processing terminal for browsing contents that do not fit within one screen is conventionally known. For example, in a state where one part of a content having a size larger than a screen is displayed on the screen, a mobile phone disclosed in Japanese Laid-Open Patent Publication No. 2000-66801 enables moving the content by an operation on a numerical keypad of the mobile phone. Additionally, this mobile phone displays information indicating a position of the currently displayed content with respect to all the contents in an area outside the display area of the content. For example, a ratio of an amount of contents that have been already displayed at present to the total amount of display contents is represented as a percentage. Therefore, when the display has moved to an end of the content, the user can understand that the display has moved to an end of the content by seeing information on a percentage display.

With the mobile phone described in the Japanese Laid-Open Patent Publication No. 2000-66801, it is necessary to estimate where a content has been moved by using information displayed at an area outside the display area of the content. However, the user will be paying attention to the content when browsing the content. Therefore, in order to see the information at an area outside the display area of the content, the user will take his or her sight off the content for a moment to confirm the information at an area outside the display area of the content. As a result, if the user is performing an operation to move the content while paying attention to the content, even after reaching an end of the content, the user will try to further move the content, thereby generating a futile operation. In other words, the user will conduct a futile operation by trying to further move the content even after reaching an end of the content, and then, shift his or her sight to the information displayed outside the content area to confirm the information and recognize they have reached an end of the content. Therefore, it has been difficult to intuitively understand reaching an end of the content.

SUMMARY OF THE INVENTION

Therefore, an object of the present invention is to provide a computer-readable storage medium having stored thereon a display control program which can improve usability for a user by allowing the user to intuitively understand reaching an end of a display object such as a content and the like.

In order to achieve the above described object, the present invention has adopted the following configurations.

A first aspect is a computer-readable storage medium having stored thereon a display control program executed by a computer of a display control apparatus which displays, on a display device, a selection object selected in accordance with an operation by a user, the display control program causing the computer to operate as first movement control means, display control means, and second movement control means. The first movement control means moves, relative to a display area of the display device, a plurality of selection objects having at least one part thereof displayed on the display area, based on an output signal outputted from an input device. The display control means displays, on the display area, an object that is different from the selection objects, when, among the plurality of selection objects moved by the first movement control means, an end-located selection object reaches a predetermined position of the display area. The second movement control means moves, relative to the display area, the object displayed by the display control means, based on an output signal outputted from the input device.

The first aspect allows the user to intuitively understand that the selection objects have been moved to an end, without the need of narrowing the area in order to display the selection objects; thereby enabling a further increase of usability for the user.

In a second aspect based on the first aspect, the computer is further caused to operate as object erasing means for erasing, from the display area, the object displayed by the display control means, when the input device stops outputting an output signal.

The second aspect allows the user to easily understand contents of the selection objects as soon as an operation (for example, operation of scrolling) for moving the plurality of selection objects has been stopped, thereby enabling increase of usability.

In a third aspect based on the first aspect, the second movement control means moves the object after the first movement control means stops moving the selection objects.

The third aspect allows the user to intuitively understand that the selection objects cannot be moved further.

In a fourth aspect based on the first aspect, the second movement control means moves the object in a moving direction determined based on an output signal outputted from the input device.

In a fifth aspect based on the fourth aspect, the computer is further caused to operate as object erasing means for erasing the object from the display area by moving the object in a direction opposite to the moving direction, when the input device stops outputting an output signal.

The fourth and fifth aspects allow the user to understand that the selection objects cannot be moved further, by moving the object in accordance with an operation of moving a pointed position and erasing the object when the operation is stopped.

In a sixth aspect based on the fifth aspect, the second movement control means displays the object so as to emerge from an end of the display area from a direction opposite of the moving direction determined based on an output signal outputted from the input device. In addition, the object erasing means erases the object by moving the object toward the end of the display area.

The sixth aspect allows to relieve a sense of discomfort for the user, since the object emerges and moves in a natural manner, associated with the operation of moving the pointed position.

In a seventh aspect based on the first aspect, the display control means displays the object in a manner such that the object is superimposed on front surfaces of the selection objects.

The seventh aspect allows the user to intuitively understand that the selection objects cannot be moved further.

In an eighth aspect based on the seventh aspect, the display control means displays a semi-transparent object as the object in a manner such that the semi-transparent object is superimposed on front surfaces of the selection objects.

The eighth aspect allows the user to understand contents of the selection objects and intuitively understand that the selection objects have been moved to an end, by using the semi-transparent object and allowing the user to understand that the selection objects have been moved to an end.

In a ninth aspect based on the eighth aspect, the display control means changes the transparency of the object in accordance with the movement of the object.

In a tenth aspect based on the ninth aspect, the display control means changes the transparency of the object such that the transparency becomes lower as a movement distance of the object becomes larger.

The ninth and tenth aspects allow the user to intuitively understand that the selection objects have moved to an end, since the transparency of the object changes.

In an eleventh aspect based on the first aspect, the display control means changes a shape of the object in accordance with a movement of the object.

In a twelfth aspect based on the first aspect, the display control means changes a size of the object in accordance with a movement of the object.

The eleventh and twelfth aspects allow the user to intuitively understand that the selection objects have moved to an end.

A thirteenth aspect is a display control system which displays, on a display device, a selection object selected in accordance with an operation by a user, the display control system including first movement control means, display control means, and second movement control means. The first movement control means moves, relative to a display area of the display device, a plurality of selection objects having at least one part thereof displayed on the display area, based on an output signal outputted from an input device. The display control means displays, on the display area, an object that is different from the selection objects, when, among the plurality of selection objects moved by the first movement control means, an end-located selection object reaches a predetermined position of the display area. The second movement control means moves, relative to the display area, the object displayed by the display control means, based on an output signal outputted from the input device.

A fourteenth aspect is a display control apparatus which displays, on a display device, a selection object selected in accordance with an operation by a user, the display control apparatus including first movement control means, display control means, and second movement control means. The first movement control means moves, relative to a display area of the display device, a plurality of selection objects having at least one part thereof displayed on the display area, based on an output signal outputted from an input device. The display control means displays, on the display area, an object that is different from the selection objects, when, among the plurality of selection objects moved by the first movement control means, an end-located selection object reaches a predetermined position of the display area. The second movement control means moves, relative to the display area, the object displayed by the display control means, based on an output signal outputted from the input device.

A fifteenth aspect is a display control method for displaying, on a display device, a selection object selected in accordance with an operation by a user, the display control method including a first movement control step, a display control step, and a second movement control step. The first movement control step is a step of moving a plurality of selection objects having at least one part thereof displayed on a display area of the display device, based on an output signal outputted from an input device. The display control step is a step of displaying, on the display area, an object that is different from the selection objects, when, among the plurality of selection objects moved at the first movement control step, an end-located selection object reaches a predetermined position of the display area. The second movement control step is a step of moving, relative to the display area, the object displayed by the display control step, based on an output signal outputted from the input device.

A sixteenth aspect is a computer-readable storage medium having stored thereon a display control program executed by a computer of a display control apparatus which displays, on a display device, a content to be browsed by a user, the display control program causing the computer to operate as first movement control means, display control means, and second movement control means. The first movement control means moves, relative to a display area of the display device, a content having at least one part thereof displayed on the display area, based on an output signal outputted from an input device. The display control means displays, on the display area, an object that is different from the content, when an end of the content, which is moved by the first movement control means, reaches a predetermined position of the display area. The second movement control means moves, relative to the display area, the object displayed by the display control means, based on an output signal outputted from the input device.

A seventeenth aspect is a computer-readable storage medium having stored thereon a display control program executed by a computer of a display control apparatus which displays, on a display device, a content to be browsed by a user, the display control program causing the computer to operate as first movement control means, display control means, and second movement control means. The first movement control means moves, relative to a display area of the display device, a plurality of contents having at least one part thereof displayed on the display area, based on an output signal outputted from an input device. The display control means displays, on the display area, an object that is different from the plurality of contents displayed on the display area, when, among the plurality of contents moved by the first movement control means, an end-located content reaches a predetermined position of the display area. The second movement control means moves, relative to the display area, the object displayed by the display control means, based on an output signal outputted from the input device.

The thirteenth to seventeenth aspects can obtain the same advantageous effect as that of the first aspect.

The present invention allows an user to intuitively understand moving to an end of a plurality of selection object, when the user is performing an operation of move the plurality of selection objects (for example, an operation of scrolling).

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the drawings. Note that the present invention is not limited to this embodiment.

Figure 1:
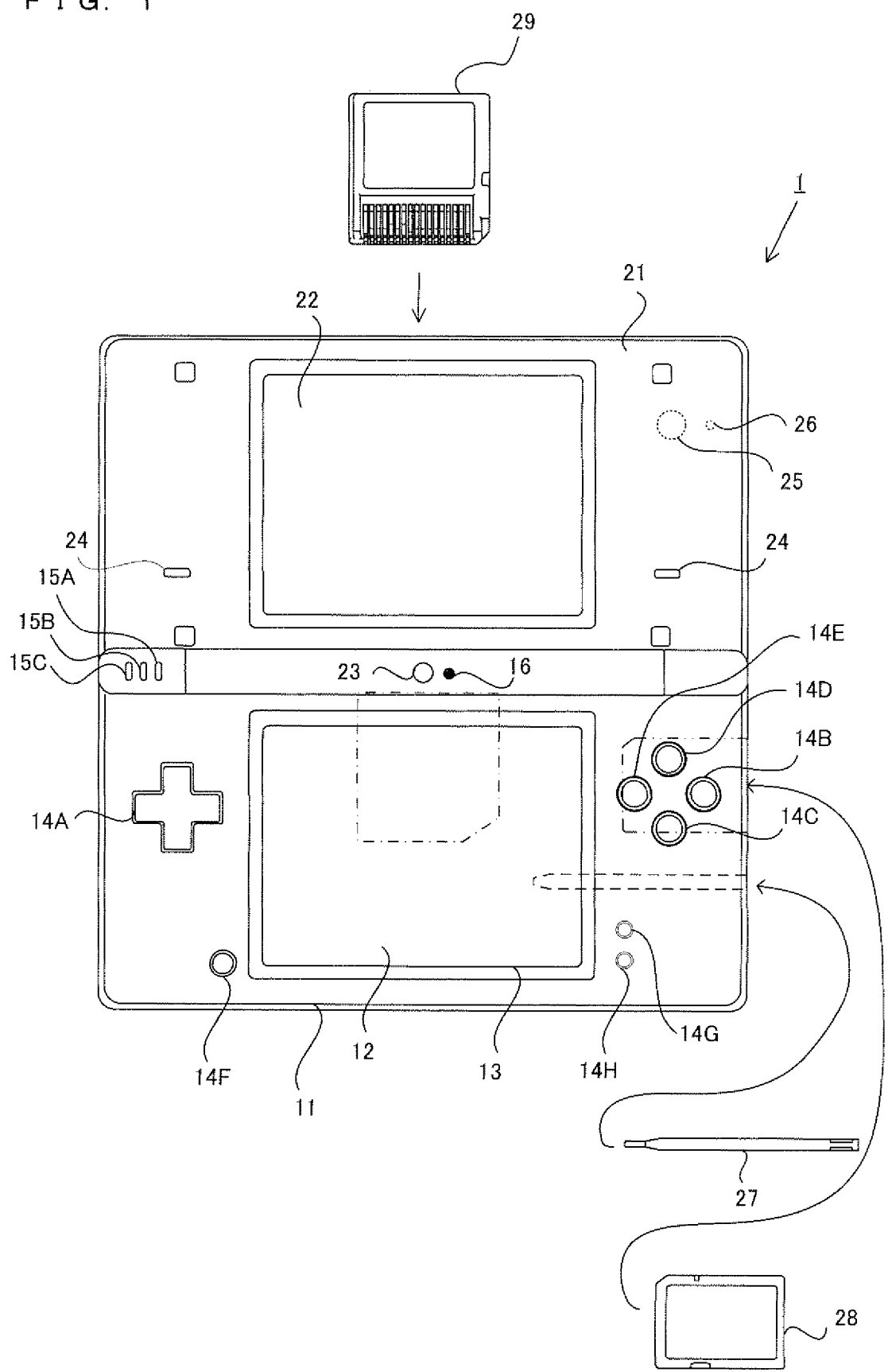
FIG. 1 is an exterior view of a game apparatus 1 according to an embodiment of the present invention.

FIG. 1 is an exterior view of a game apparatus 1 for executing a menu processing program of the present invention. Here, a hand-held game apparatus is shown as one example the game apparatus 1. In FIG. 1, the game apparatus 1 is a foldable hand-held game apparatus in an opened state. The game apparatus 1 is configured to have such a size as to be held by a user with one hand or both hands in the opened state.

The game apparatus 1 includes a lower housing 11 and an upper housing 21. The lower housing 11 and the upper housing 21 are connected to each other so as to be capable of being opened or closed (foldable). In the example of FIG. 1, the lower housing 11 and the upper housing 21 are each formed in a plate-like shape of a horizontally long rectangle, and rotatably connected to each other at long side portions thereof. Normally, the user uses the game apparatus 1 in the opened state. When not using the game apparatus 1, the user keeps the game apparatus 1 in a closed state. In the example shown in FIG. 1, in addition to the closed state and the opened state, the game apparatus 1 is capable of maintaining an angle between the lower housing 11 and the upper housing 21 at any angle ranging between the closed state and the opened state by frictional force generated at a connection portion and the like. In other words, the upper housing 21 can be stationary at any angle with respect to the lower housing 11.

In the lower housing 11, a lower LCD (Liquid Crystal Display) 12 is provided. The lower LCD 12 has a horizontally long shape, and is located such that a long side thereof corresponds to a long side direction of the lower housing 11. Note that although an LCD is used as a display device built-in the game apparatus 1 in the present embodiment, any other display devices such as a display device using an EL (Electra Luminescence) and the like may be used. In addition, the game apparatus 1 can use a display device of any resolution. Although details will be described below, the lower LCD 12 is used mainly for displaying an image taken by an inner camera 23 or an outer camera 25 in real time.

In the lower housing 11, operation buttons 14A to 14K and a touch panel 13 are provided as input devices. As shown in FIG. 1, among the operation buttons 14A to 14K, the direction input button 14A, the operation button 14B, the operation button 14C, the operation button 14D, the operation button 14E, the power button 14F, the start button 14G, and the select button 14H are provided on an inner main surface of the lower housing 11 which is located inside when the upper housing 21 and the lower housing 11 are folded. The direction input button 14A is used, for example, for a selection operation and the like. The operation buttons 14B to 14E are used, for example, for a determination operation, a cancellation operation, and the like. The power button 14F is used for turning on or off the power of the game apparatus 1. In the example shown in FIG. 1, the direction input button 14A and the power button 14F are provided on the inner main surface of the lower housing 11 and on one of a left side and a right side (on the left side in FIG. 1) of the lower LCD 12 provided in the vicinity of the center of the inner main surface of the lower housing 11. Further, the operation buttons 14B to 14E, the start button 14G, and the select button 14H are provided on the inner main surface of the lower housing 11 and on the other of the left side and the right side (on the right side in FIG. 1) of the lower LCD 12. The direction input button 14A, the operation buttons 14B to 14E, the start button 14G, and the select button 14H are used for performing various operations on the game apparatus 1.

Note that the operation buttons 14I to 14K are omitted in FIG. 1. For example, the L button 14I is provided at a left end of an upper surface of the lower housing 11, and the R button 14J is provided at a right end of the upper surface of the lower housing 11. The L button 14I and the R button 14J are used, for example, for performing a photographing instruction operation (shutter operation) on the game apparatus 1. In addition, the volume button 14K is provided on a left side surface of the lower housing 11. The volume button 14K is used for adjusting volume of loudspeakers of the game apparatus 1.

The game apparatus 1 further includes the touch panel 13 as another input device in addition to the operation buttons 14A to 14K. The touch panel 13 is mounted on the lower LCD 12 so as to cover the screen of the lower LCD 12. In the present embodiment, the touch panel 13 is, for example, a resistive film type touch panel. However, the touch panel 13 is not limited to the resistive film type, but any press-type touch panel may be used. The touch panel 13 used in the present embodiment has the same resolution (detection accuracy) as that of the lower LCD 12. However, the resolution of the touch panel 13 and that of the lower LCD 12 may not necessarily be the same with each other. In a right side surface of the lower housing 11, an insertion opening (indicated by a dashed line in FIG. 1) is provided. The insertion opening is capable of accommodating a touch pen 27 which is used for performing an operation on the touch panel 13. Although an input onto the touch panel 13 is usually performed using the touch pen 27, in addition to the touch pen 27, a finger of the user can be used for operating the touch panel 13.

In the right side surface of the lower housing 11, an insertion opening (indicated by a two-dot chain line in FIG. 1) is formed for accommodating a memory card 28. Inside the insertion opening, a connector (not shown) is provided for electrically connecting the game apparatus 1 to the memory card 28. The memory card 28 is, for example, an SD (Secure Digital) memory card, and detachably mounted on the connector. The memory card 28 is used, for example, for storing an image taken by the game apparatus 1, and loading an image generated by another apparatus into the game apparatus 1.

Further, in the upper surface of the lower housing 11, an insertion opening (indicated by a chain line in FIG. 1) is formed for accommodating a cartridge 29. Inside the insertion opening, a connector (not shown) is provided for electrically connecting the game apparatus 1 to the cartridge 29. The cartridge 29 is a storage medium storing a game program and the like, and detachably mounted in the insertion opening provided in the lower housing 11.

Three LEDs 15A to 15C are mounted on a left side part of the connection portion where the lower housing 11 and the upper housing 21 are connected to each other. Three LEDs 15A to 15C are mounted on a left side part of the connection portion where the lower housing 11 and the upper housing 21 are connected to each other. The game apparatus 1 is capable of performing wireless communication with another apparatus, and the first LED 15A is lit up while the power of the game apparatus 1 is ON. The second LED 15B is lit up while the game apparatus 1 is being charged. The third LED 15C is lit up while wireless communication is established. Thus, by the three LEDs 15A to 15C, a state of ON/OFF of the power of the game apparatus 1, a state of charge of the game apparatus 1, and a state of communication establishment of the game apparatus 1 can be notified to the user.

Meanwhile, in the upper housing 21, an upper LCD 22 is provided. The upper LCD 22 has a horizontally long shape, and is located such that a long side direction thereof corresponds to a long side direction of the upper housing 21. In a similar manner to that of the lower LCD 12, a display device of another type having any resolution may be used instead of the upper LCD 22. A touch panel may be provided so as to cover the upper LCD 22. On the upper LCD 22, for example, an operation explanation screen for teaching the user roles of the operation buttons 14A to 14K and the touch panel 13 is displayed.

In the upper housing 21, two cameras (the inner camera 23 and the outer camera 25) are provided. As shown in FIG. 1, the inner camera 23 is mounted in an inner main surface in the vicinity of the connection portion of the upper housing 21. On the other hand, the outer camera 25 is mounted in a surface opposite to the surface in which the inner camera 23 is mounted, namely, in an outer main surface of the upper housing 21 (which is the surface located on the outside of the game apparatus 1 in the closed state, and the back surface of the upper housing 21 shown in FIG. 1). In FIG. 1, the outer camera 25 is indicated by a dotted line. Thus, the inner camera 23 is capable of taking an image in a direction in which the inner main surface of the upper housing 21 faces, and the outer camera 25 is capable of taking an image in a direction opposite to an imaging direction of the inner camera 23, namely, in a direction in which the outer main surface of the upper housing 21 faces. In other words, in the present embodiment, the two cameras 23 and 25 are provided such that the imaging directions thereof are opposite to each other. For example, the user can take an image of a view seen from the game apparatus 1 toward the user with the inner camera 23 as well as an image of a view seen from the game apparatus 1 in a direction opposite to the user with the outer camera 25.

In the inner main surface in the vicinity of the connection portion, a microphone (a microphone 42 shown in FIG. 2) is accommodated as a voice input device. In the inner main surface in the vicinity of the connection portion, a microphone hole 16 is formed to allow the microphone 42 to detect sound outside the game apparatus 1. The accommodating position of the microphone 42 and the position of the microphone hole 16 are not necessarily in the connection portion. For example, the microphone 42 may be accommodated in the lower housing 11, and the microphone hole 16 may be formed in the lower housing 11 so as to correspond to the accommodating position of the microphone 42.

In the outer main surface of the upper housing 21, a fourth LED 26 (indicated by a dashed line in FIG. 1) is mounted. The fourth LED 26 is lit up at a time when photographing is performed (when the shutter button is pressed) with the outer camera 25. Further, the fourth LED 26 is lit up while a moving picture is being taken by the outer camera 25. By the fourth LED 26, it is notified to an object person whose image is taken and people around the object person that photographing is performed (being performed) by the game apparatus 1.

Sound holes 24 are formed in the inner main surface of the upper housing 21 and on left and right sides, respectively, of the upper LCD 22 provided in the vicinity of the center of the inner main surface of the upper housing 21. The loudspeakers are accommodated in the upper housing 21 and at the back of the sound holes 24. The sound holes 24 are for releasing sound from the speakers to the outside of the game apparatus 1 therethrough.

As described above, the inner camera 23 and the outer camera 25 which are components for taking an image, and the upper LCD 22 which is display means for displaying, for example, an operation explanation screen at the time of photographing are provided in the upper housing 21. On the other hand, the input devices for performing an operation input on the game apparatus 1 (the touch panel 13 and the buttons 14A to 14K), and the lower LCD 12 which is display means for displaying the game screen are provided in the lower housing 11. Accordingly, when using the game apparatus 1, the user can hold the lower housing 11 and perform an input on the input device while seeing a taken image (an image taken by one of the cameras) displayed on the lower LCD 12.

Figure 2:
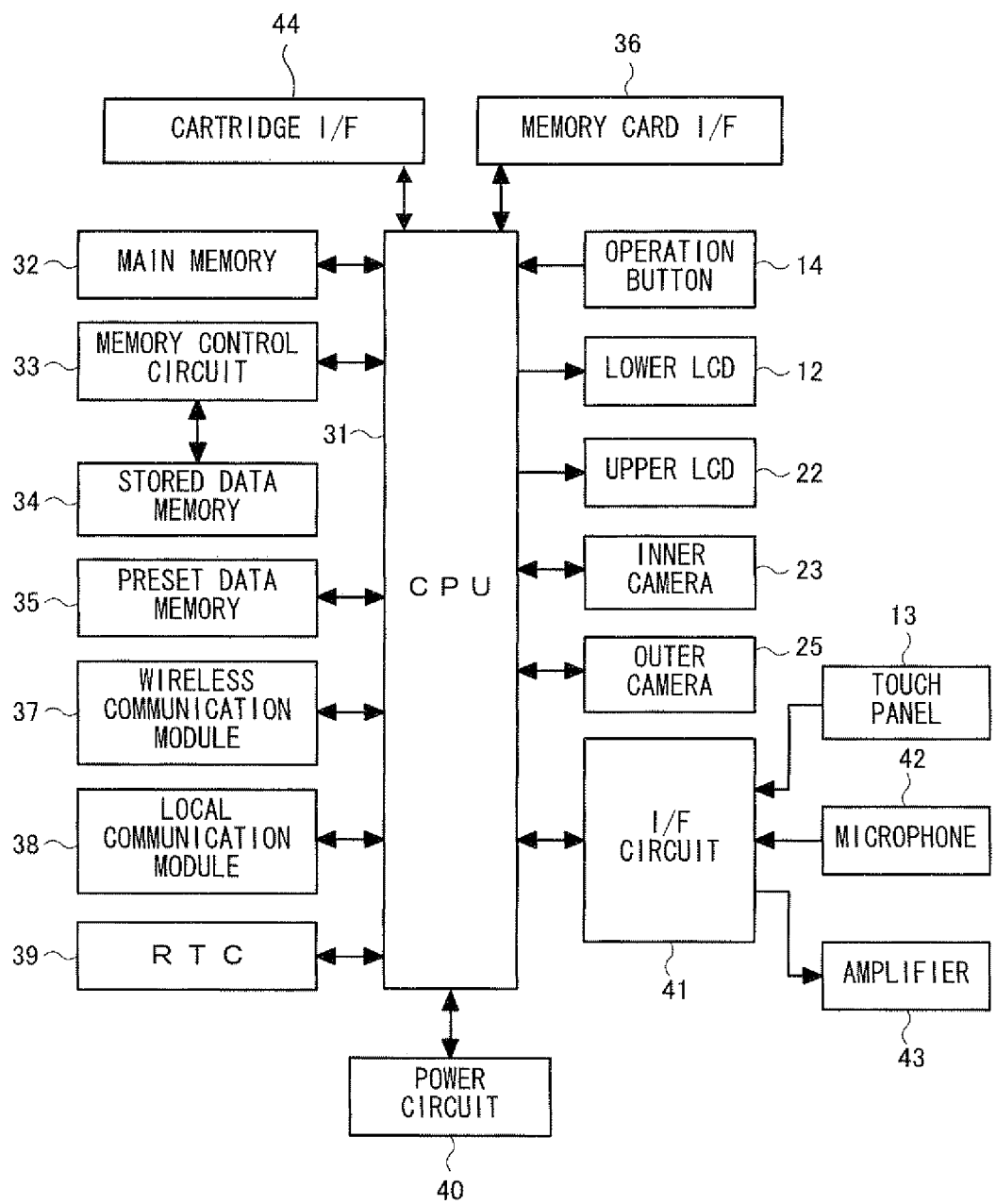
FIG. 2 is a block diagram of the game apparatus 1 according to an embodiment of the present invention.

Next, an internal configuration of the game apparatus 1 will be described with reference to FIG. 2. FIG. 2 is a block diagram showing one example of the internal configuration of the game apparatus 1.

As shown in FIG. 2, the game apparatus 1 includes electronic components including a CPU 31, a main memory 32, a memory control circuit 33, a stored data memory 34, a preset data memory 35, a memory card interface (memory card I/F) 36 and a cartridge I/F 44, a wireless communication module 37, a local communication module 38, a real time clock (RTC) 39, a power circuit 40, an interface circuit (I/F circuit) 41, and the like. These electronic components are mounted on an electronic circuit substrate and accommodated in the lower housing 11 (or may be accommodated in the upper housing 21).

The CPU 31 is information processing means for executing a predetermined program. Note that a program executed by the CPU 31 may be stored in advance in a memory within the game apparatus 1, may be obtained from the memory card 28 and/or the cartridge 29, or may be obtained from another apparatus by means of communication with said another apparatus. For example, a program may be obtained by means of download via the Internet from a predetermined server, or may be obtained by downloading a predetermined program stored in a stationary game apparatus through communication therewith.

The main memory 32, the memory control circuit 33, and the preset data memory 35 are connected to the CPU 31. The stored data memory 34 is connected to the memory control circuit 33. The main memory 32 is storage means used as a work area and a buffer area of the CPU 31. In the present embodiment, for example, a PSRAM (Pseudo-SRAM) is used as the main memory 32. The stored data memory 34 is storage means for storing a program executed by the CPU 31, data of images taken by the inner camera 23 and the outer camera 25, and the like. The stored data memory 34 is constructed of a nonvolatile storage medium, for example, a NAND flash memory, in the present embodiment. The memory control circuit 33 is a circuit for controlling reading of data from the stored data memory 34 or writing of data to the stored data memory 34 in accordance with an instruction from the CPU 31. The preset data memory 35 is storage means for storing, in the game apparatus 1, data (preset data) of various parameters and the like which are set in advance, and a later described menu processing program and the like. A flash memory connected to the CPU 31 via an SPI(Serial Peripheral Interface) bus can be used as the preset data memory 35.

The memory card I/F 36 is connected to the CPU 31. The memory card I/F 36 reads data from the memory card 28 mounted on the connector or writes data to the memory card 28 in accordance with an instruction from the CPU 31. In the present embodiment, data of images taken by the outer camera 25 is written to the memory card 28, and image data stored in the memory card 28 is read from the memory card 28 to be stored in the stored data memory 34.

The cartridge I/F 44 is connected to the CPU 31. The cartridge I/F 44 reads out data from the cartridge 29 mounted to the connector or writes data to the cartridge 29 in accordance with an instruction from the CPU 31.

The wireless communication module 37 functions to connect to a wireless LAN device, for example, by a method conformed to the standard of IEEE802.11.b/g. The local communication module 38 functions to wirelessly communicate with a game apparatus of the same type by a predetermined communication method. The wireless communication module 37 and the local communication module 38 are connected to the CPU 31. The CPU 31 is capable of receiving data from and transmitting data to another apparatus via the Internet using the wireless communication module 37, and capable of receiving data from and transmitting data to another game apparatus of the same type using the local communication module 38.

The RTC 39 and the power circuit 40 are connected to the CPU 31. The RTC 39 counts a time, and outputs the time to the CPU 31. For example, the CPU 31 is capable of calculating a current time (date) and the like based on the time counted by the RTC 39. The power circuit 40 controls electric power from a power supply (typically, a battery accommodated in the lower housing 11) of the game apparatus 1 to supply the electric power to each electronic component of the game apparatus 1.

The game apparatus 1 includes the microphone 42 and an amplifier 43. The microphone 42 and the amplifier 43 are connected to the I/F circuit 41. The microphone 42 detects voice produced by the user toward the game apparatus 1, and outputs a sound signal indicating the voice to the IT circuit 41. The amplifier 43 amplifies the sound signal from the I/F circuit 41, and causes the speakers (not shown) to output the sound signal. The I/F circuit 41 is connected to the CPU 31.

The touch panel 13 is connected to the I/F circuit 41. The I/F circuit 41 includes a sound control circuit for controlling the microphone 42 and the amplifier 43 (the speakers), and a touch panel control circuit for controlling the touch panel 13. The sound control circuit performs A/D conversion or D/A conversion of the sound signal, and converts the sound signal into sound data in a predetermined format. The touch panel control circuit generates touch position data in a predetermined format based on a signal from the touch panel 13, and outputs the touch position data to the CPU 31. For example, the touch position data is data indicating coordinates of a position at which an input is performed on an input surface of the touch panel 13. The touch panel control circuit reads a signal from the touch panel 13 and generates touch position data every predetermined period of time. The CPU 31 is capable of recognizing a position at which an input is performed on the touch panel 13 by obtaining the touch position data.

An operation button 14 includes the above operation buttons 14A to 14K, and is connected to the CPU 31. The operation button 14 outputs operation data indicating an input state of each of the buttons 14A to 14K (whether or not each button is pressed) to the CPU 31. The CPU 31 obtains the operation data from the operation button 14, and performs processing in accordance with an input performed onto the operation button 14.

The inner camera 23 and the outer camera 25 are connected to the CPU 31. Each of the inner camera 23 and the outer camera 25 takes an image in accordance with an instruction from the CPU 31, and outputs data of the taken image to the CPU 31. In the present embodiment, the CPU 31 gives an imaging instruction to the inner camera 23 or the outer camera 25, and the camera which has received the imaging instruction takes an image and transmits image data to the CPU 31.

The lower LCD 12 and the upper LCD 22 are connected to the CPU 31. Each of the lower LCD 12 and the upper LCD 22 displays an image thereon in accordance with an instruction from the CPU 31.

Next, a general outline of a process envisioned by the present embodiment will be described. The process of the present embodiment envisions a situation in which a scroll object such as a content and the like having a size that cannot be displayed in a single screen is browsed while being scrolled. Here, the scroll object is, for example, an electronic book content for an electronic book viewer, an electronic document for an electronic document viewer and the like, and a browse object (contents such as an HTML document and a Web page, including a combination of documents and images) for various browsers such as an interne browser (HTML browser). Also included as the scroll object referred here are those including a plurality of objects which are to be selected by the user and which are viewable as a list and which are browsed by using a scroll operation, and examples of those include thumbnails of images on an image viewer, a screen displaying a possession item listing in a game process, a screen displaying a plurality of buttons, and the like. Also categorized as the scroll object is a content of a menu in a menu screen of the game apparatus 1 (a group of contents including a plurality of contents shown as content icons 101 described later), and the content of the menu is provided as an example for the specific process of the present embodiment in the following description. Hereinafter, this scroll object will be referred to simply as a content.

When browsing total contents that cannot be displayed all on a single screen as described above, the user can browse all the contents by performing an operation of scrolling the contents (hereinafter, referred to as a scroll operation).

One example of the scroll operation as described above is a so-called drag operation. For example, when one part of the contents is displayed on a screen with a touch panel (the lower LCD 12 in the present embodiment), by performing touch-on to the touch panel 13 by using the touch pen 27 and preforming a slide movement to a predetermined direction, for example, from in the left to right direction by using the touch pen 27, the displayed contents can be scrolled to the right direction. As a result, a portion of the contents desired for viewing can be moved within a display screen (display area). Envisioned here is a case where an end of the contents of the browse object has been reached (a case where an end of the contents is displayed in the screen) by repeatedly conducting the scroll operation by the drag operation. In this case, since an end of the contents has been reached, further scroll operation will be a futile operation. In such a case, the present embodiment will notify the user in an intuitive manner about reaching an end of the contents by performing a representation process in coordination with the scroll operation. In the following, such representation process to notify reaching of an end of the contents will be referred to as "scroll limit representation".

Figure 3:
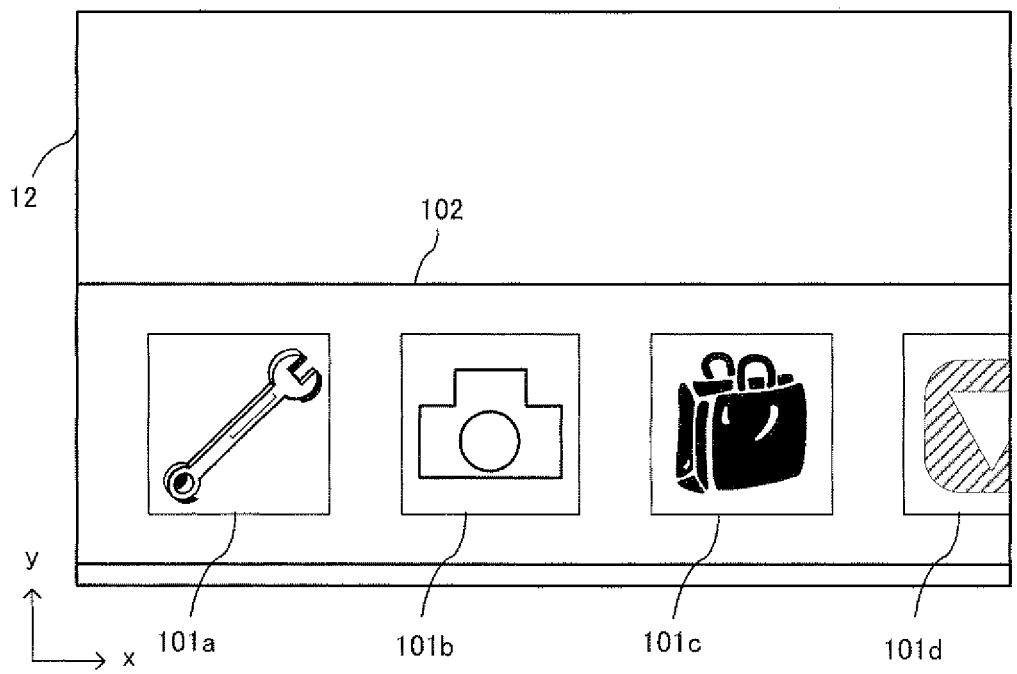
FIG. 3 is one example of a screen of the game apparatus 1 envisioned by the present embodiment.

FIG. 3 is one example of a screen of the game apparatus 1 envisioned by the present embodiment. Used as an example in the present embodiment is not an operation mode in which a predetermined game starts up as soon as the power is turned on, but an operation mode in which a menu screen is displayed first. FIG. 3 shows the menu screen displayed when the game apparatus 1 has been started up. The menu screen shown in FIG. 3 is displayed on a content area 102 on the lower LCD 12. A plurality of content icons 101a to 101d (hereinafter, may be referred to by a generic name "content icon") are arranged side by side in a line and displayed on the content area 102. The content icons respectively correspond to predetermined applications (for example, a camera application, an online shopping application, a game application, an application for configuring the game apparatus, and the like). By performing a tap operation on each of the icons, the user can start up an application that corresponds to a tapped icon. Note that, a cursor is displayed on either one of the display content icons, and, in this state, an application corresponding to the content icon on which the cursor is displayed may be started up by hold down, for example the button 14B. Here, the number of content icons is more than that capable of being displayed all on a single screen, and the content icons are arranged side by side in a line. The content icon 101a is an icon that is at the leftmost end of this group of content icons. Furthermore, scrolling is possible by performing the drag operation as described above on the content area 102 in the horizontal direction of the content area 102. Thus, the respective content icons 101 can be scrolled as a group (as a group of contents). In the following, such scrolling may be termed simply as "scrolling the content area 102".

Figure 4:
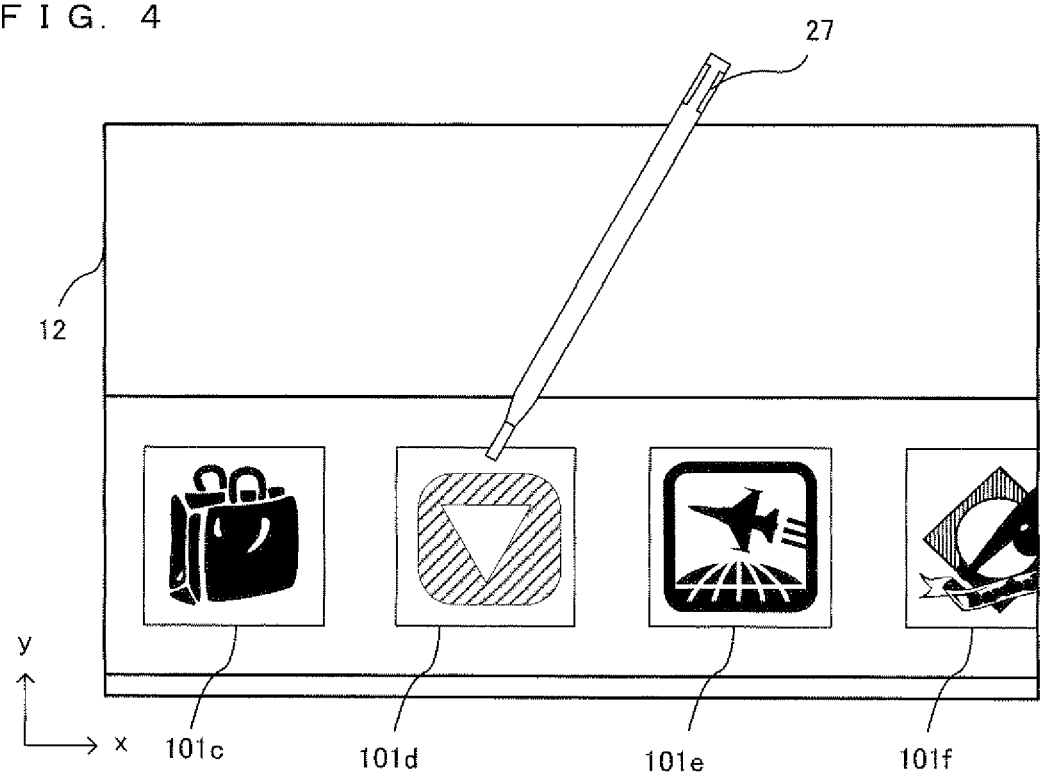
FIG. 4 is one example of a screen of the game apparatus 1 envisioned by the present embodiment.
Figure 5:
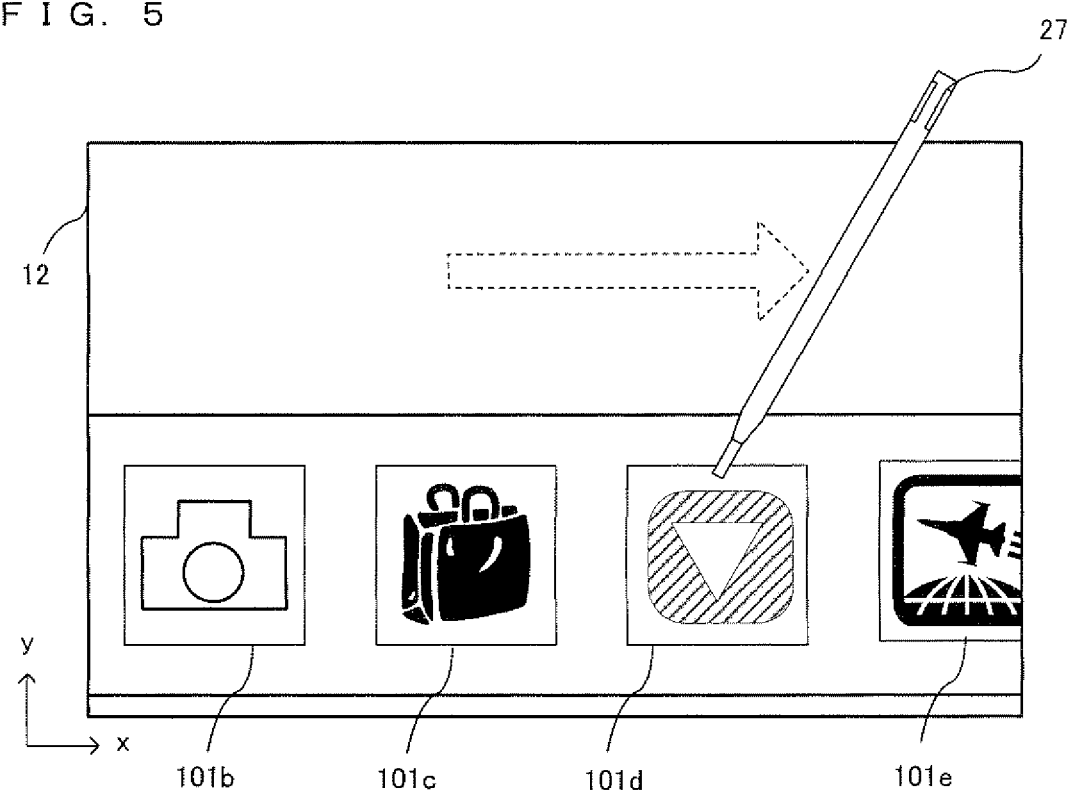
FIG. 5 is one example of a screen of the game apparatus 1 envisioned by the present embodiment.
Figure 6:
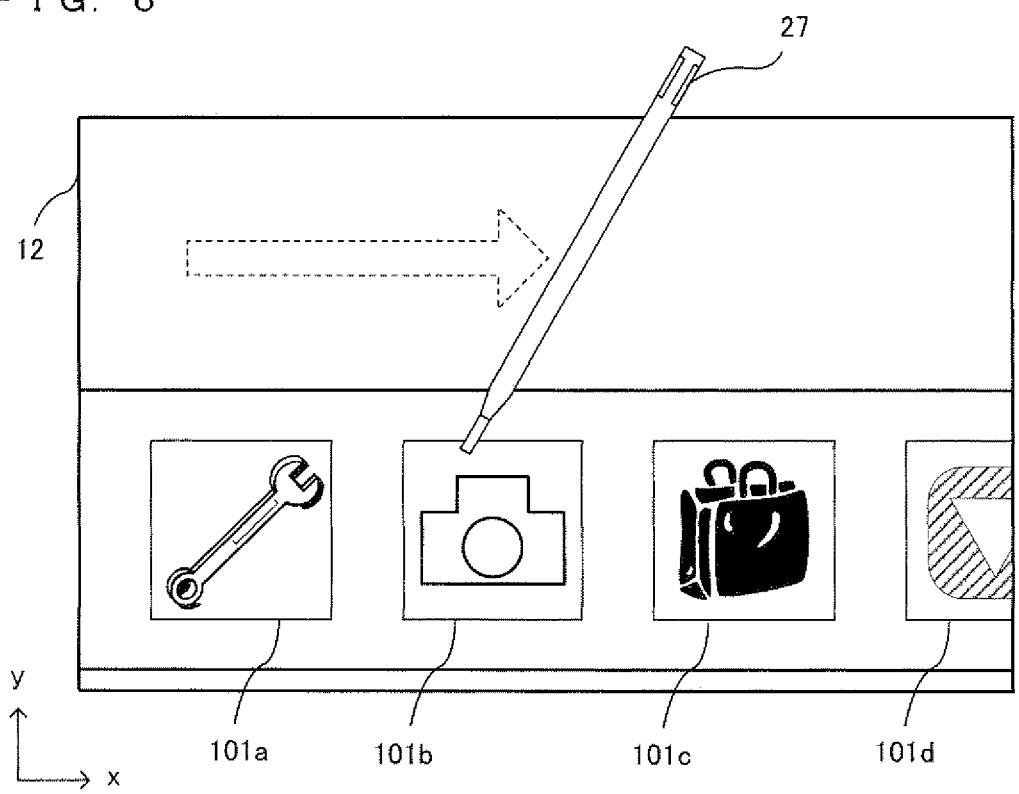
FIG. 6 is one example of a screen of the game apparatus 1 envisioned by the present embodiment.

One specific example is a case where, as shown in FIG. 4, touch-on is performed on the content icon 101d and a drag operation is performed toward the right direction on the screen displaying content icons 101c to 101f. This will result in a state where the content area 102 is scrolled to display content icons 101b to 101e on the screen as shown in FIG. 5. Next, a touch-off is performed once, and then a touch-on is performed on the content icon 101b to perform a drag operation toward the right direction again. As shown in FIG. 6, this will result in a state where the content icon 101a corresponding to the leftmost end of the content is fully included within the screen (proximity of the left end of the screen). Thus, this is in a state of reaching the end of the contents as a result of the scroll operation.

Note that, in order to easily understand the example, provided as an example is case where the content icon 101d is touched-on; however, the above described scrolling is also possible when a portion in the content area 102 other than the content icons 101 is touched-on to perform the drag operation.

Figure 7:
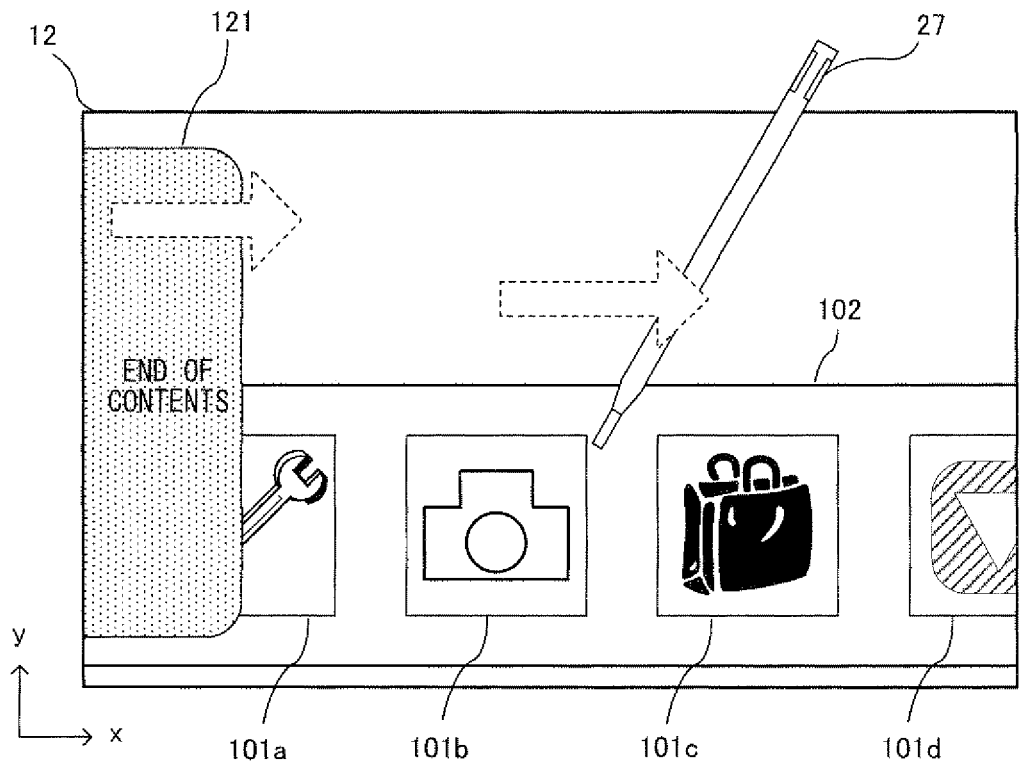
FIG. 7 is one example of a screen of the game apparatus 1 envisioned by the present embodiment.
Figure 8:
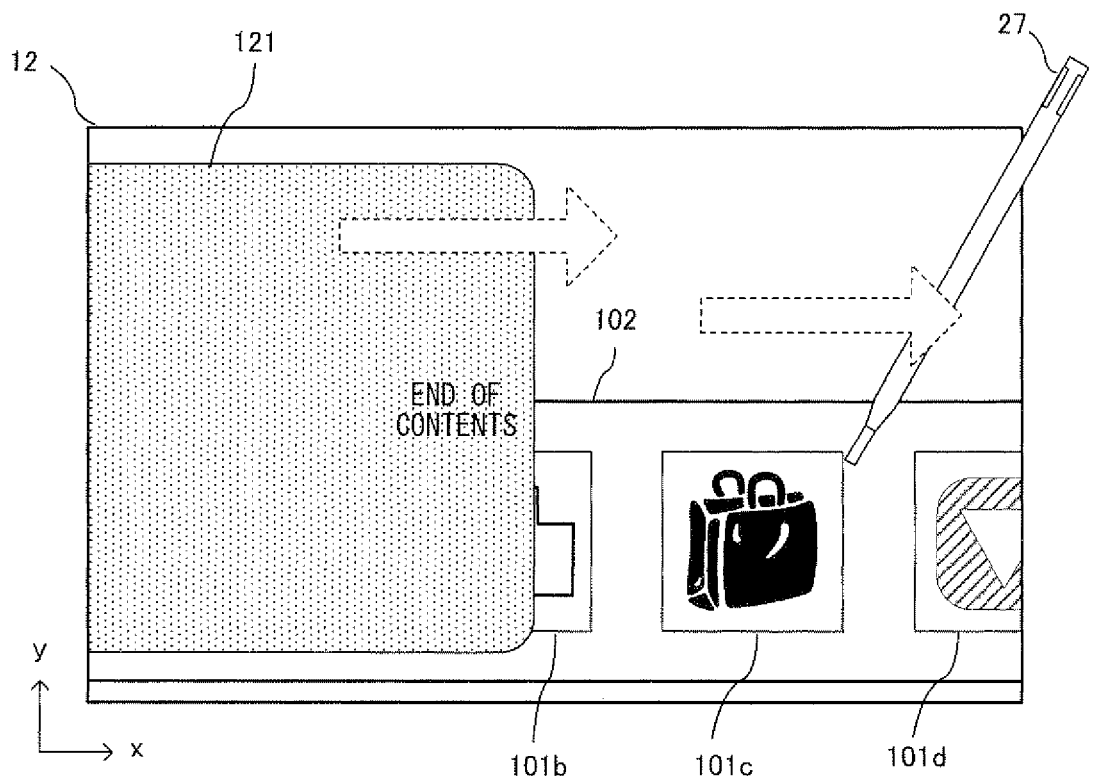
FIG. 8 is one example of a screen of the game apparatus 1 envisioned by the present embodiment.
Figure 9:
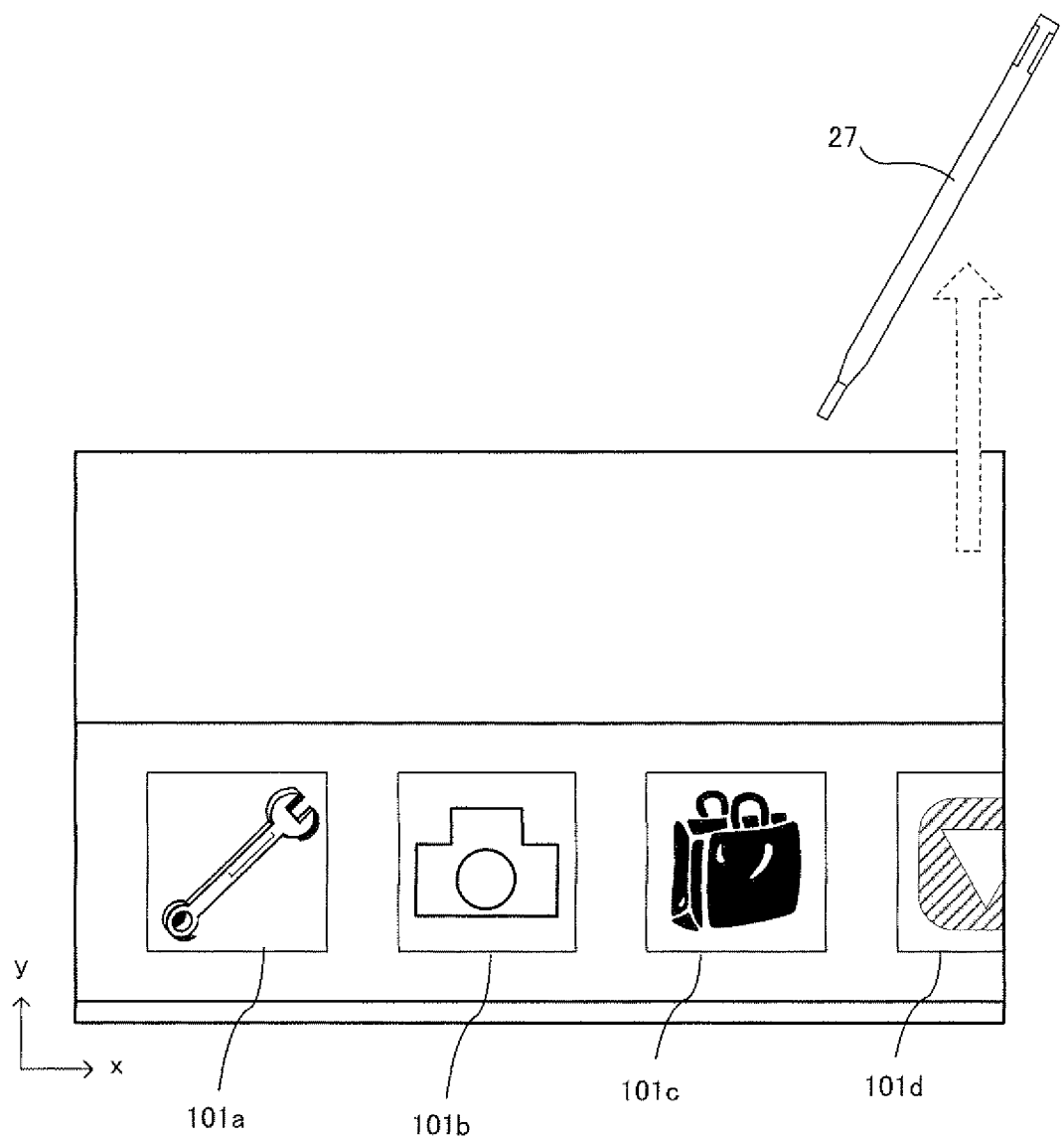
FIG. 9 is one example of a screen of the game apparatus 1 envisioned by the present embodiment.

Here, in the state as shown in FIG. 6, the user moves the touch pen 27 (pointed position) further toward the right direction without performing a touch-off. Thus, an operation of further scrolling the contents is performed even though the left end of the contents has been reached. If such an operation is performed, in the present embodiment, as shown in FIG. 7 and FIG. 8, a semi-transparent notification object 121 emerges from the left end of the screen, which is on the opposite side of the scrolling direction of the contents, so as to be superimposed on the content area 102, and moves in the horizontal direction in accordance with the movement of the touch pen 27. More specifically, if the touch pen is moved to the right direction, the notification object 121 moves toward the right (displayed as if it is drawn out from the left end of the screen); and if the touch pen is moved to the left direction, the notification object 121 also moves toward the left (displayed as if it is withdrawn in the left end of the screen). On the other hand, the content area 102 (including each of the content icons 101) is not to be scrolled but is fixed. Therefore, by having the notification object 121 to emerge when the scrolling of the contents stops, the user can intuitively understand that he or she has scrolled to an end of the contents. Note that, in FIG. 8, a string of characters for indicating an end of the contents is also shown on the notification object 121. Then, if the user performs a touch-off in a state as shown in FIG. 8, the notification object 121 moves so as to be withdrawn in the left end of the screen, and thereby results in a state as shown in FIG. 9. Thus, the notification object 121 moves in a direction opposite to the scrolling direction of the contents, and disappears from the screen. In the present embodiment, such a representation of having the notification object 121 to emerge and move in a state where an end of the contents is displayed, corresponds to the above described scroll limit representation.

As described above, in the present embodiment, when an end of the content has been reached resulting from the scroll operation and when further scroll operation is performed, the notification object 121, which is an object different from the contents, is displayed and moved in coordination with the scroll operation. As a result, the user can intuitively recognize that he or she has scrolled to an end of the contents.

Furthermore, in the example with the scroll operation described above, only the drag operation has been provided as an example; however, other than this, in the present embodiment, a flick operation is also possible for scrolling the contents (an operation of performing a touch-on, moving a finger or the touch pen so as to lightly swipe the screen, and performing a touch-off; in other words, performing a touch-on and then an operation so as to flick). The result is a scroll operation having inertia in accordance with the strength of the flick operation. When such flick operation is performed, the scrolling will continue for a short time even after the touch-off, due to inertia force that is based on the strength of the flick operation. Note that, the scrolling stops at the moment when an end of the contents is reached during the scrolling due to this inertia force (hereinafter, referred to as inertia scrolling). Furthermore, when the flick operation is performed in a state where an end of the contents is already displayed (refer to FIG. 6), the notification object 121 emerges and moves based on the inertia force caused by the flick operation. In the following, such inertia scrolling and controlling by the inertia force of the notification object 121 are referred to as "inertia representation".

In the following, details of various data and program used in the present embodiment will be described by using FIG. 10 to FIG. 18.

Figure 10:
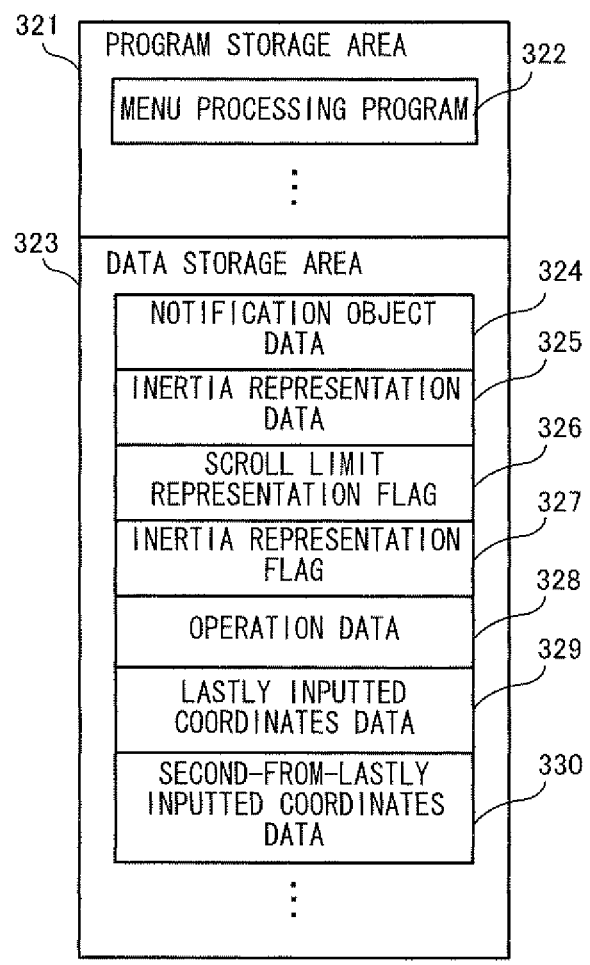
FIG. 10 illustrational figure show a memory map of a main memory 32.

FIG. 10 is an illustrative figure showing a memory map of the main memory 32 shown in FIG. 2. In FIG. 10, the main memory 32 includes a program storage area 321 and a data storage area 323. Data in the program storage area 321 and the data storage area 323 are obtained by copying, to the main memory 32, data previously stored in the preset data memory 35.

The program storage area 321 stores a menu processing program 322 and the like executed by the CPU 31.

Data such as notification object data 324, inertia representation data 325, a scroll limit representation flag 326, an inertia representation flag 327, operation data 328, lastly inputted coordinates data 329, second-from-lastly inputted coordinates data 330, and the like are stored in the data storage area 323.

The notification object data 324 is data representing the notification object 121 used in the scroll limit representation described above.

The inertia representation data 325 is data used for a process of the inertia scrolling as described above (hereinafter, referred to as inertia representation).

The scroll limit representation flag 326 is a flag for showing whether or not the scroll limit representation for indicating an end of the contents when an end of the contents is displayed on the screen is conducted. When the flag is set to be ON, this indicates that the scroll limit representation is being conducted.

The inertia representation flag 327 is a flag for indicating whether or not the process of inertia scrolling (inertia representation) is being executed. When the flag is set to be ON, this indicates being in the midst of executing the process of inertia scrolling.

The operation data 328 is data indicating an input state of each of the operation buttons 14a to 14K and an input state of the touch panel 13. Furthermore, when there is an input to the touch panel 13, data indicating coordinates of the input is also included in the operation data 328.

The lastly inputted coordinates data 329 is data indicating coordinates of an input to the touch panel in a process in an immediately preceding frame. In the process in an immediately preceding frame, if there is no input to the touch panel 13, the data will be empty, and if there is an input to the touch panel 13, the coordinates of the input is stored. Therefore, by referring to the data, a change in touch position (input coordinates) during the drag operation and the like can be calculated, and eventually an amount of movement of the touch pen 27 can be calculated.

The second-from-lastly inputted coordinates data 330 is data indicating input coordinates acquired immediately before the lastly inputted coordinates data described above; that is, input coordinates detected in a process in a frame preceding the current frame by two frames.

Figure 11:
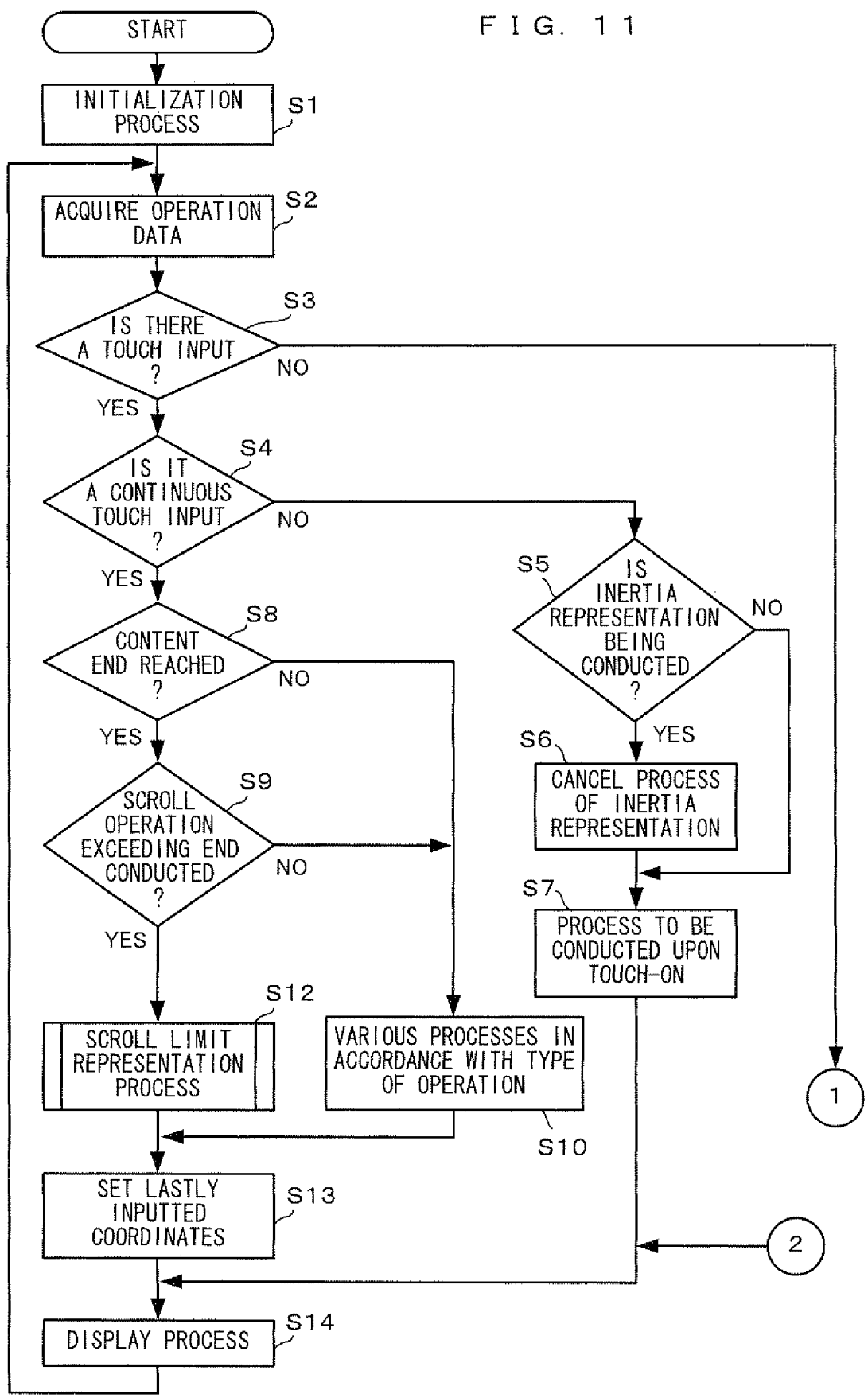
FIG. 11 is a flowchart showing a flow of a menu process executed in the game apparatus 1.
Figure 12:
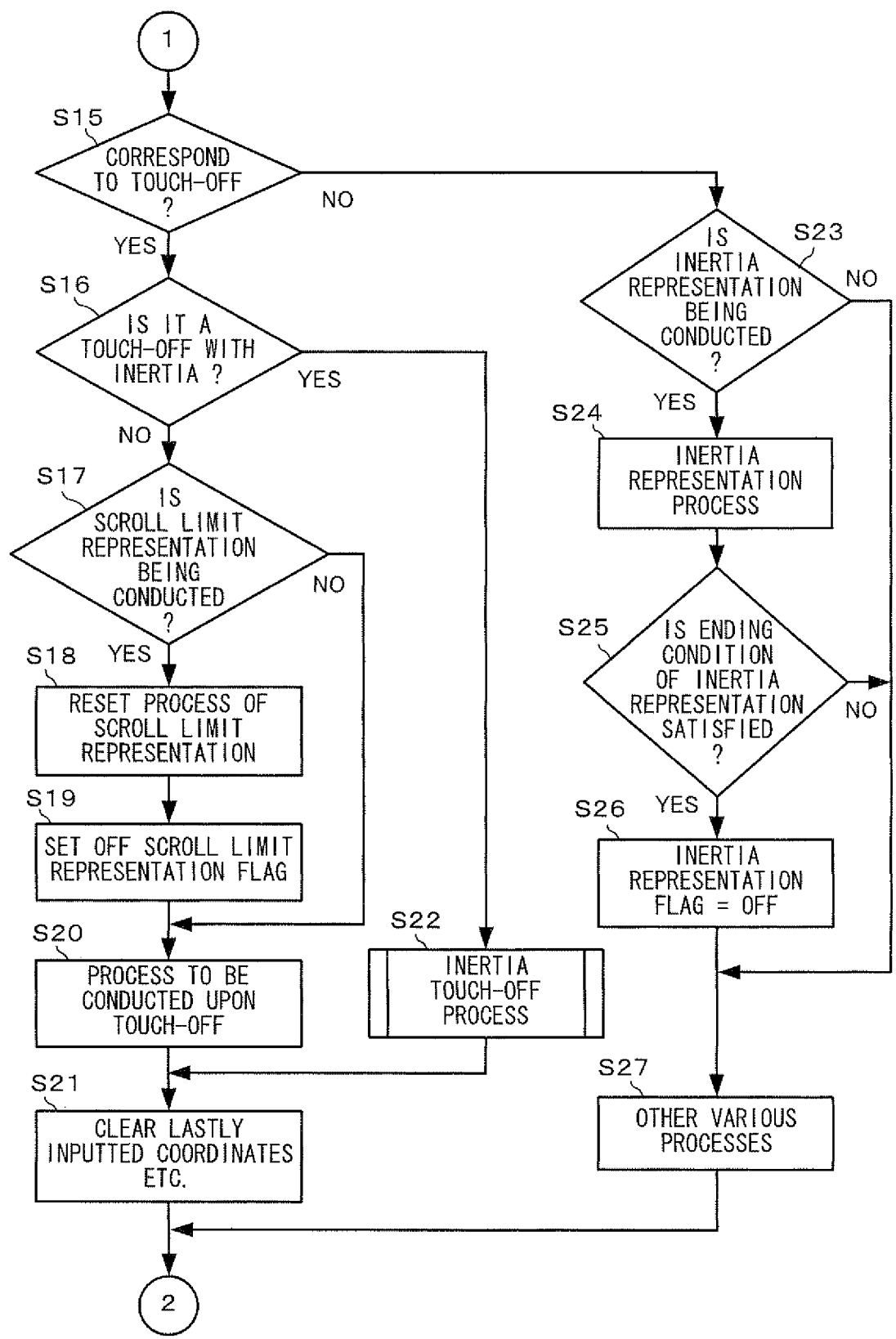
FIG. 12 is a flowchart showing a flow of a menu process executed in the game apparatus 1.
Figure 13:
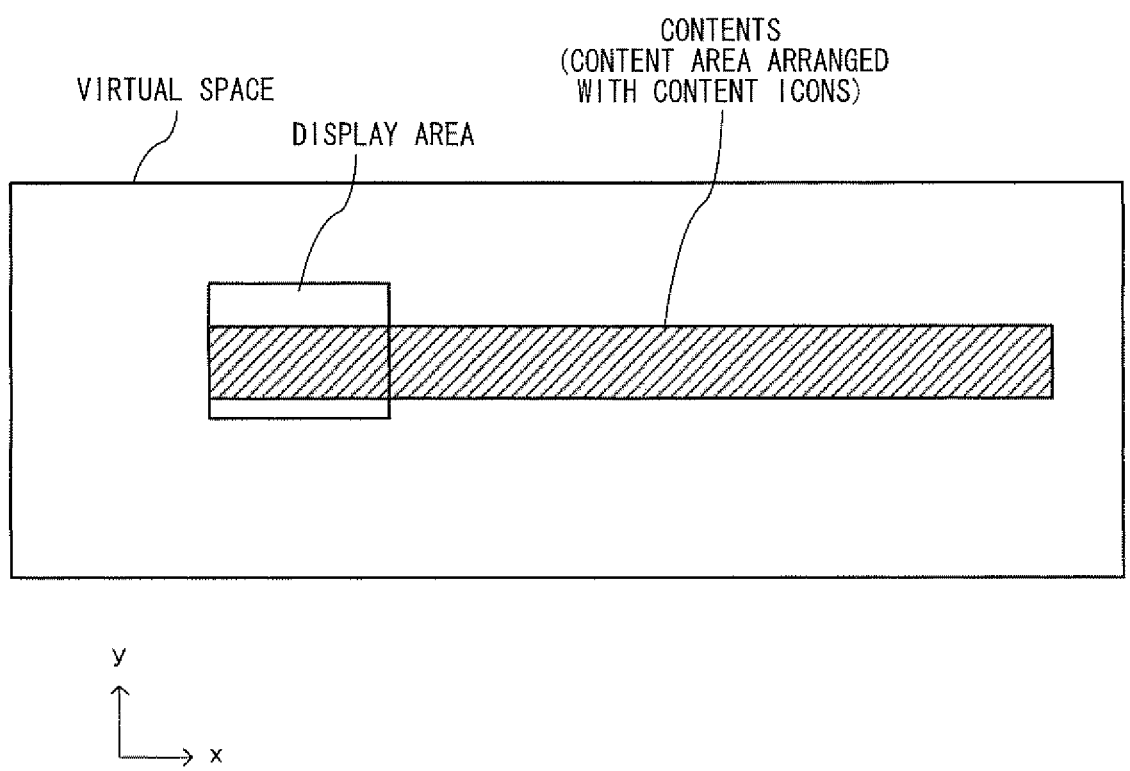
FIG. 13 is a drawing for explaining a concept of a content arrangement.

A flow of the menu process executed in the game apparatus 1 will be described next by using FIG. 11 to FIG. 18. FIG. 11 and FIG. 12 are flowcharts showing flows of the menu process executed in the game apparatus 1. When the power of the game apparatus 1 is turned on, the CPU 31 of the game apparatus 1 performs a start-up program stored in a boot ROM not shown, and each unit of the main memory 32 and the like is initialized. Then, the menu program stored in the preset data memory 35 is loaded into the main memory 32, and execution of the menu program is started.

First, in step S1, initialization process for data to be used in the following process is executed. Specifically, first, contents (in the present embodiment, the content icons 101) is generated and arranged in a virtual space (in the present embodiment, the content area 102 allocated in the virtual space) (refer to FIG. 13). Then, a virtual camera is arranged at a position where a predetermined area of one part of the contents is displayed, and an area (hereinafter, display area) imaged by the virtual camera is displayed on the screen. In the present embodiment, when the scroll operation as described above is conduct, scrolling of the contents is achieved by conducting a slide movement of the virtual camera (i.e., display area) on the contents in accordance with the type of operation. In the following, an area imaged by the virtual camera is referred to as the display area. Note that, when the virtual camera is fixed and the scroll operation as described above is conducted, the contents may be move within the virtual space in accordance with the type of operation.

Note that, the method for displaying the content and the method of the scroll process described above are merely examples and the present invention is not limited thereto, and any processing method may be used as long as displaying and scrolling of the contents can be conducted.

Subsequently, the menu process proceeds by having a process loop of steps S2 to S27 repeated in every single frame.

Next, at step S2, the operation data 328 is acquired. Then, at step S3, the acquire operation data 328 is referenced, and whether or not a touch input is performed to the touch panel 13 is determined. As a result, if it is determined that a touch input is conducted (YES at step S3), a coordinate value of the input is acquired and whether or not a continuous touch input is performed is determined at the next step S4. This is determined from whether or not some data is set in the lastly inputted coordinates data 329. As a result of the determination, if it is determined that a continuous touch input is not performed (NO at step S4), this means an operation categorized as the so-called touch-on is conducted. In this case, first, at step S5, it is determined whether or not an inertia representation is being conducted; that is, determined whether or not it is in a state in which the inertia scrolling by the flick operation as described above is still continuing. As a result, if it is determined that the inertia representation is being conducted (YES at step S5), a process of cancelling the inertia representation is executed at step S6. On the other hand, if it is determined that the inertia representation is not being conducted (NO at step S5), the process at step S6 is skipped.

Next, at step S7, a process to be conducted upon the touch-on is executed. In this process, a predetermined process in accordance with the input coordinates described above is executed as appropriate. For example, when the content icons 101 are touched-on, a process for displaying a description of an application corresponding to the content icons 101, or the like is executed. Then, the process is advanced to step S14, which is described later.

On the other hand, as a result of the determination at step S4 described above, if it is determined that a continuous touch input is conducted (YES at step S4), the possibility is either a state in which an identical position is continuously being touched, or a drag operation (scroll operation) is being conducted. In such case, next, at step S8, whether or not an end of the contents has been reached is determined for the object displayed in the screen. Thus, it is determined whether or not an end of the contents is within a predetermined position of the display area. For example, with regard to the above described example in FIG. 6, it is determined whether or not (the left side of) the content icon 101a has reached a position having a predetermined margin from the left end of the display area. As a result, if it is determined that an end of the contents has not been reached (NO at step S8), the type of operation is distinguished at step S10, and various processes based on the type of operation are performed as appropriate. For example, if the type of operation is a drag operation in a horizontal direction, the content area 102 (content icon group) is scrolled to the horizontal direction in accordance with an amount of change and change direction of the input coordinates (more precisely, scrolling of the content area 102 is achieved by moving the display area described above in accordance with the amount of change and change direction). Then, the process is advanced to step S13, which is described later.

Note that, with regard to the method of determining whether or not an end of the contents has been reached, the processing method described above is merely one example and the present invention is not limit thereto, and any processing method may be used as long as reaching at an end of the contents can be distinguished.

On the other hand, as a result of the determination at step S8, if it is determined that an end of the contents is included in the display area (YES at step S8), next, at step S9, the type of operation is distinguish based on the operation data 328, and it is determined whether or not a scroll operation exceeding the end of the contents is performed. For example, with regard to the above described example in FIG. 6, it is determined whether a drag operation to the right direction (a drag operation to a direction opposite of the end, a scroll operation so as to further move an end portion in the screen) is conducted. As a result, if a scroll operation exceeding the end of the contents is not performed (NO at step S9), the process at step S10 described above is executed. Thus, a process in accordance with the type of operation is conducted as appropriate. For example, if a drag operation to the left direction is performed in a state of FIG. 6 described above, a process of scrolling the contents in accordance with the drag operation is executed. Then, the process is advanced to step S13, which is described later.

Figure 14:
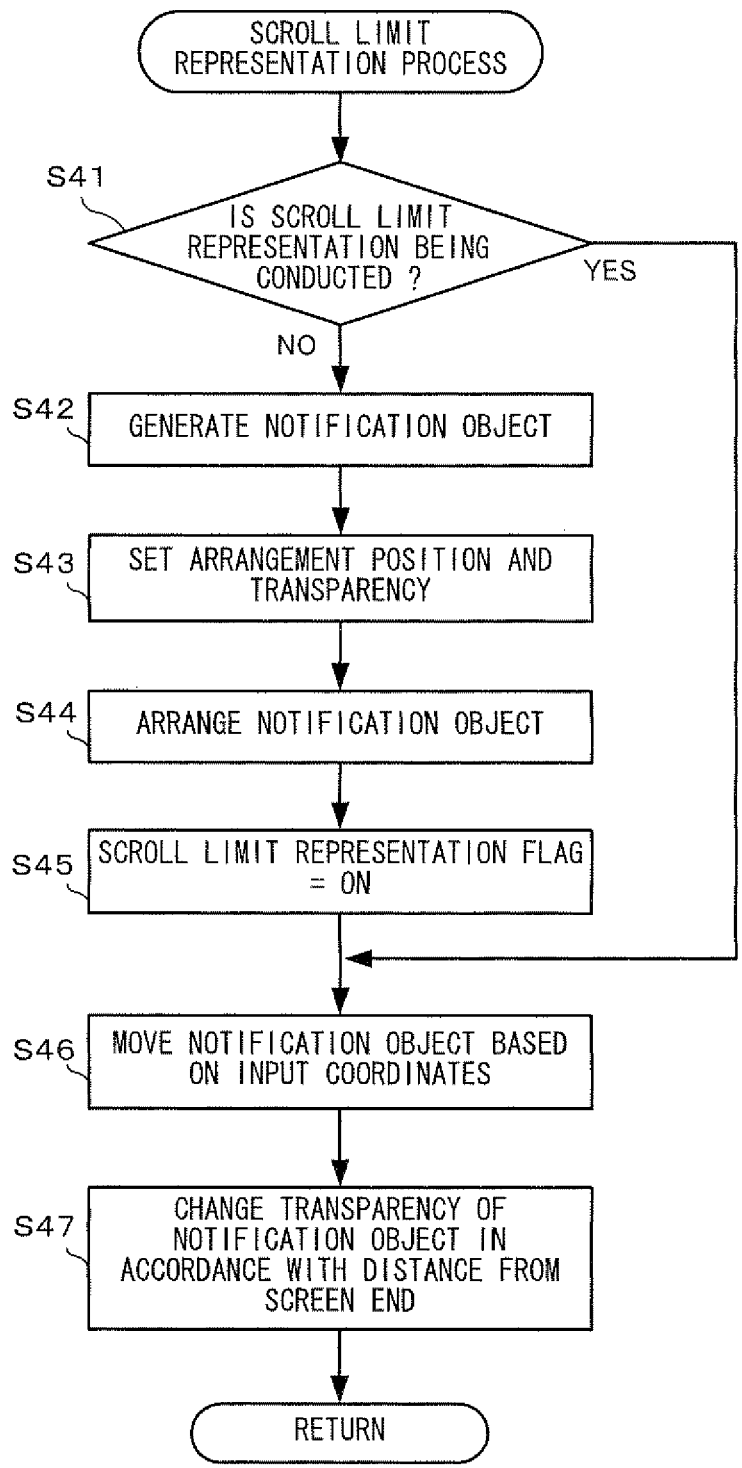
FIG. 14 is a flowchart showing details of a scroll limit representation process indicated at step S12 of FIG. 11.

On the other hand, as a result of the determination at step S9 described above, if it is determined that a scroll operation exceeding the end of the contents is performed (YES at step S9), a scroll limit representation process is executed at step S12. FIG. 14 is a flowchart showing details of the scroll limit representation process indicated at step S12 described above. In FIG. 14, first, at step S41, it is determined whether or not the scroll limit representation is being executed, by referring to the scroll limit representation flag 326. As a result, if it is determined that the scroll limit representation is being conducted (YES at step S1), the process is advanced to step S46, which is described later.

Figure 15:
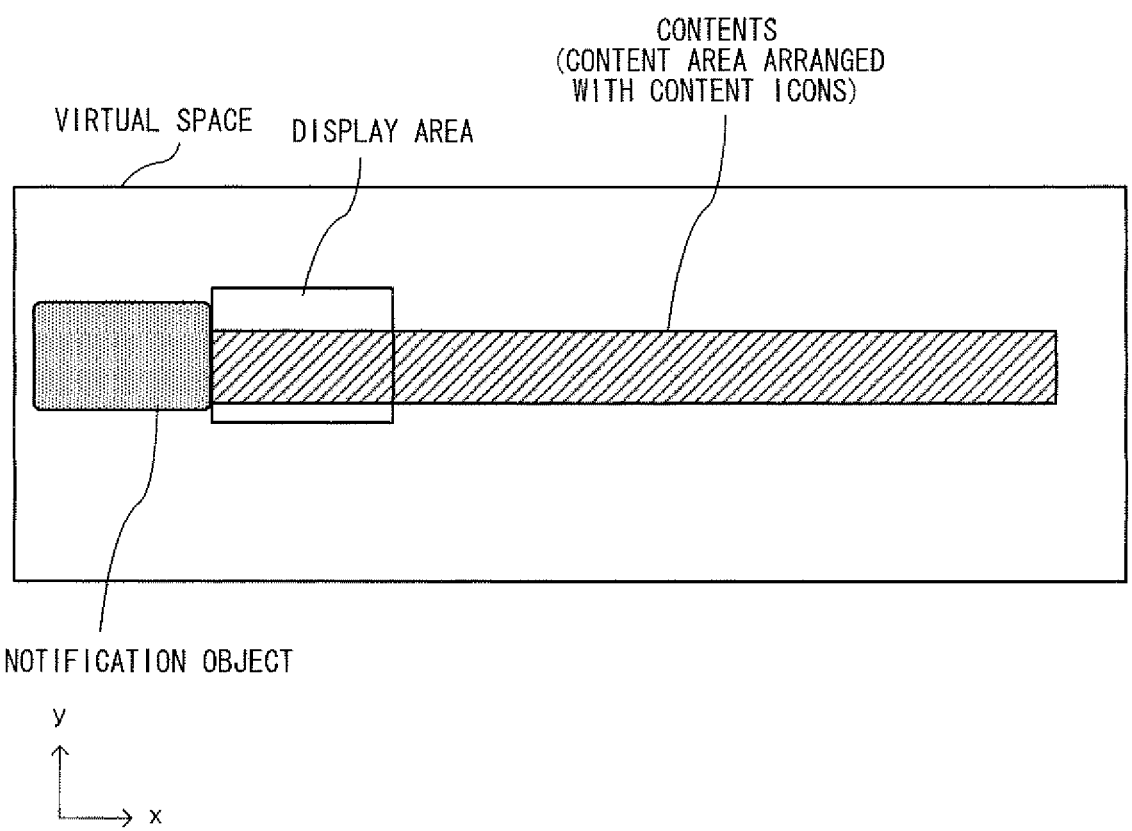
FIG. 15 is a figure showing an initial arrangement position of a notification object.

On the other hand, if it is determined that the scroll limit representation is not being conducted (NO at step S41), at the next step S42, the notification object data 324 is referenced and the notification object 121 as described above is generated. Next, at step S43, an arrangement position of the notification object 121 in the virtual space is determined. Here, as shown in FIG. 15, a position adjacent to the display area and to an end of the contents is determined as the arrangement position. Furthermore, the transparency of the notification object 121 is also set as appropriate. Alternatively, for example, the arrangement position along Y axis may be changed in accordance with the touch position. For example, when an upper part of the screen is touched, a Y axis coordinate of the center of the notification object 121 may be positioned so as to match a Y axis coordinate of the touch position.

Next, at step S44, the notification object 121 is arranged at the arrangement position in the virtual space determined above. Furthermore, at step S45, the scroll limit representation flag 326 is set to be ON.

Next, at step S46, the notification object 121 is moved in the horizontal direction as appropriate, in accordance with the type of the operation. For example, the input coordinates included in the operation data 328 and the lastly inputted coordinates data 329 are referenced, and an amount of change of the input coordinates (touch position) and the direction of the change are calculated. Then, the notification object 121 is moved as appropriate in accordance with the calculated amount of change and direction.

Figure 16:
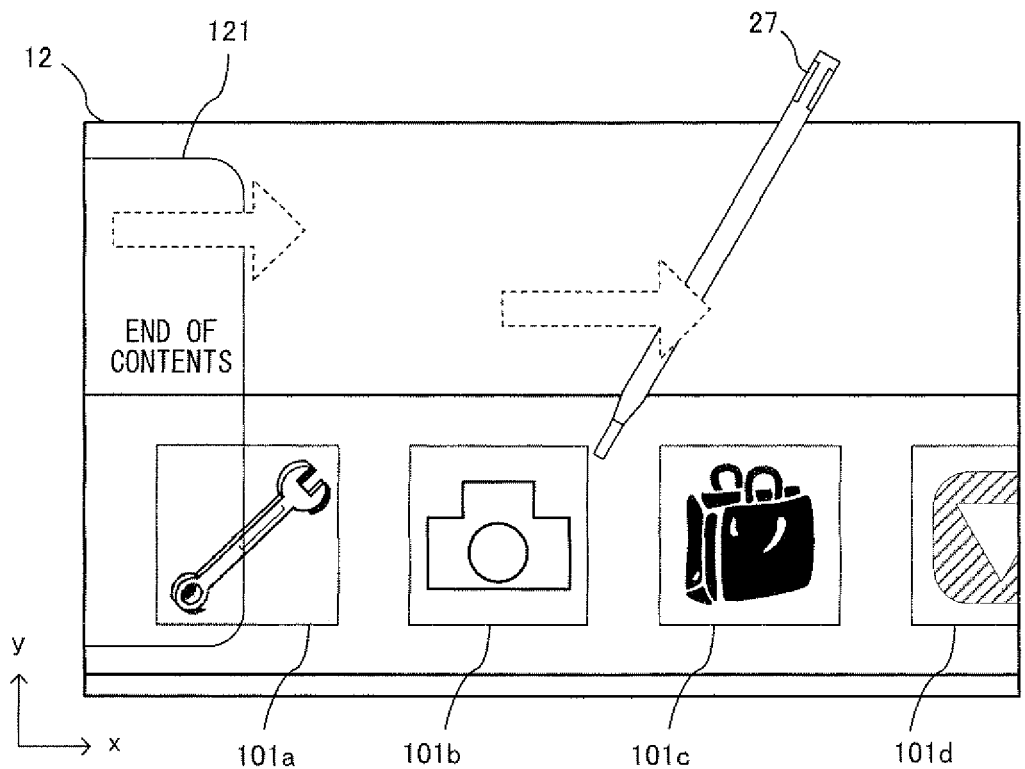
FIG. 16 is a display example of the notification object.
Figure 17:
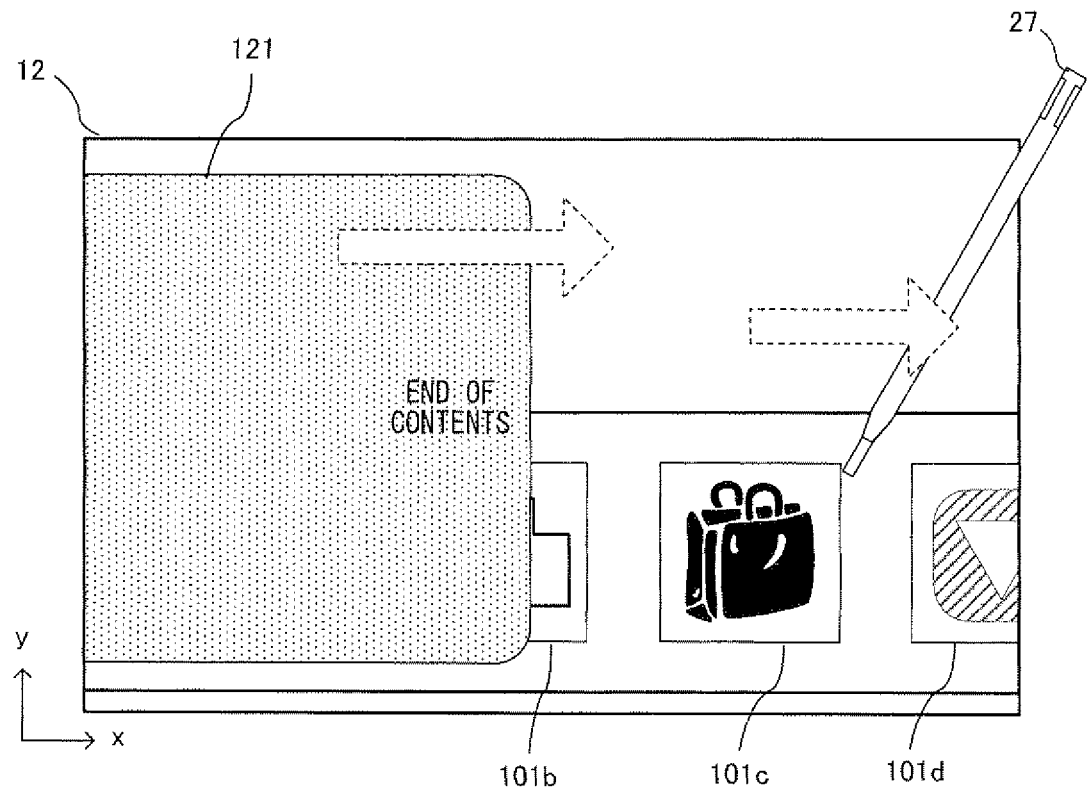
FIG. 17 is a display example of the notification object.

Next, at step S47, the transparency of the notification object is changed in accordance with a distance from an end of the display area to the end of the notification object. For example, as shown in FIG. 16 and FIG. 17, the transparency is changed so as to be higher as the distance from the screen end becomes smaller, and the transparency is changed so as to be lower as the distance from the screen end becomes larger.

With this, the scroll limit representation process ends.

Returning to FIG. 11, next to the scroll limit representation at step S12, at step S13, the lastly inputted coordinates data 329 is set. Specifically, first, a content of the lastly inputted coordinates data 329 is stored in the main memory 32 as the second-from-lastly inputted coordinates data 330. Furthermore, the input coordinates of a touch position included in the operation data acquired at step S2 described above is stored in the main memory 32 as the lastly inputted coordinates data 329. Next, at step S14, a display process is conducted. More specifically, an image reflecting the above described process is generated, and a process of displaying the image on the lower LCD 12 is executed. Then, the process returns to the above described step S2, and the process is repeated.

Described next is the process conducted when it is determined, as a result of the determination at step S3 described above, that a touch input is not performed (NO at step S3). In this case, first, at step S15 in FIG. 12, it is determined whether or not the current operation state is a touch-off. Specifically, the lastly inputted coordinates data 329 is referenced, and if some data is stored therein, the current operation state is determined as a touch-off, and if the lastly inputted coordinates data 329 is empty, the current operation state is determined as not being a touch-off (thus a state of not being touched has been continuing). As a result of the determination, if the current operation state is determined as a touch-off (YES at step S15), next, at step S16, it is determined whether or not the touch-off is one with inertia due to a flick operation as described above. This is determined from whether or not the amount of change of input coordinates, which is indicated from the lastly inputted coordinates data 329 and the second-from-lastly inputted coordinates data 330, is equal to or larger than a predetermined value. If the amount of change is at a certain degree, it is determined that a flick operation as described above is conducted and that the touch-off with inertia is generated.

As a result of the determination at step S16, if it is determined that the touch-off with inertia is performed (YES at step S16), next, at step S22, an inertia touch-off process is executed. This process is a process for conducting the inertia representation as described above.

Figure 18:
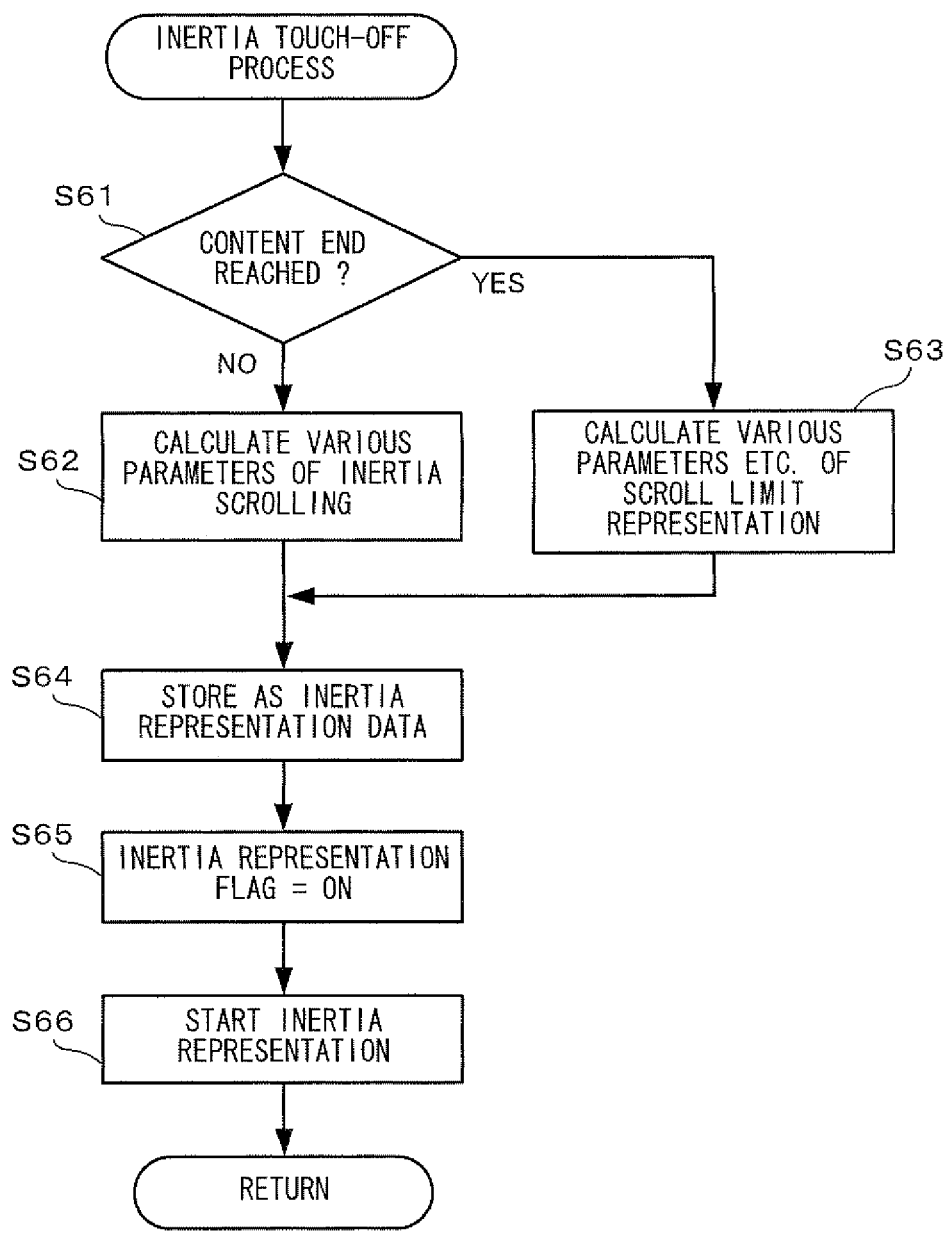
FIG. 18 is a flowchart showing details of an inertia touch-off process indicated at step S22 of FIG. 12.

FIG. 18 is a flowchart showing details of the inertia touch-off process indicated at step S22 described above. In FIG. 15, first, at step S61, it is determined whether or not the current contents end is within the display area, that is, whether or not it is in a state of reaching an end of the contents. As a result of the determination, if it is determined that an end of the contents has not been reached yet (NO at step S61), at step S62, various parameters for conducting the inertia scrolling as described above are calculated. For example, an amount of scrolling, a velocity of scrolling, a duration of scrolling, and the like are calculated in accordance with the amount of change of input coordinates indicated from the lastly inputted coordinates data 329 and the second-from-lastly inputted coordinates data 330. Then, at step S64, the calculated parameters are stored in the main memory 32 as the inertia representation data 325.

On the other hand, as a result of the determination at step S61, if it is determined that an end of the contents has been reached (YES at step S61), at step S63, various parameters for conducting the scroll limit representation as described above are calculated. Thus, the arrangement position and the like of the notification object 121 as described above are calculated. Furthermore, an amount of movement, velocity of motion, duration of motion, and the like are calculated for the notification object 121, in accordance with the amount of change of the input coordinates indicated by the lastly inputted coordinates data 329 and the second-from-lastly inputted coordinates data 330. Which means, various parameters necessary for conducting the scroll limit representation with inertia force are calculated. Then, the calculated parameters are stored as the inertia representation data 325 at step S64 described above.

Next, at step S65, the inertia representation flag 327 is set to be ON. At the following step S66, the inertia representation is initiated based on the inertia representation data 325. As a result, the above described inertia scrolling will be displayed if an end of the contents has not been reached when the touch-off caused by the flick operation is performed. Furthermore, if the touch-off caused by the flick operation is performed at a state of reaching an end of the contents, the above described scroll limit representation based on inertia force will be displayed, even in a state where the user is not touching the touch panel 13. With this, the inertia touch-off process ends.

Returning to FIG. 12, when the process at step S22 ends, the process is advanced to step S21, which is described later.

On the other hand, as a result of the determination at step S16 described above, if it is determined that the touch-off with inertia is not conducted (i.e., a normal touch-off without the flick operation is performed) (NO at step S16); next, at step S17, it is determined whether or not the scroll limit representation is being conducted by referring to the scroll limit representation flag 326. As a result, if it is determined that the scroll limit representation is being conducted (YES at step S17), this means the touch-off is conducted in a state where the notification object 121 is displayed as shown in FIG. 8 and the like described above. Therefore, at step S18, resetting of the scroll limit representation is conducted. Thus, a process for withdrawing the notification object 121 in the screen end and erasing the notification object 12 is executed. Next, at step S19, the scroll limit representation flag 326 is set to be OFF.

On the other hand, as a result of the determination at step S17 described above, if it is determined that the scroll limit representation is not being conducted (NO at step S17), the processes at steps S18 and S19 described above are skipped.

Next, at step S20, various processes to be conducted upon touch-off are executed. For example, if a touch-off is conducted in a state where a content icon 101 has been touched (i.e., if a tap operation is performed on the content icon 101), a process and the like for starting up an application corresponding to the content icon 101 that has been touched is executed. Note that, when any application starts up, the menu process stops for a moment but restarts when the application ends.

Next, at step S21, associated with the touch-off operation, the lastly inputted coordinates data 329 and the second-from-lastly inputted coordinates data 330 are cleared. Then, the process is advanced to step S14, which is described above.

Described next is the process conducted when it is determined as not being a touch-off as a result of the determination at step S15 described above (NO at step S15). In this case, it can be assumed that a state where the user is not touching the touch panel is continuing. In such case, first, at step S23, the inertia representation flag 327 is referenced, and it is determined whether or not the inertia representation is being conducted. As a result, if it is determined that the inertia representation is not being conducted (NO at step S23), the process is advanced to step S27, which is described later.

On the other hand, if it is determined that the inertia representation is being conducted (YES at step S23), next, at step S24, the process of the inertia representation based on the inertia representation data 325 is continued.

Next, at step S25, whether or not an ending condition of the inertia representation is satisfied is determined. For example, depending on whether or not the inertia scrolling has reached an amount indicated by the inertia representation data 325, whether or not the inertia representation should be ended is determined. In addition, the ending condition of the inertia representation is determined to be satisfied also when an end the contents has been reached during the inertia scrolling. As a result of the determination of step S25, if it is determined that the ending condition of the inertia representation is not satisfied (NO at step S25), the process is advanced to step S27, which is described later.

On the other hand, if it is determined that the ending condition of the inertia representation is satisfied (YES at step S25), at step S26, the inertia representation flag 327 is set to be OFF.

Next, at step S27, various processes for those other than the inertia representation described above are performed as appropriate. Descriptions of these processes are omitted since they are not directly related to the present embodiment. Then, the process is advanced to step S14 described above. This concludes the descriptions of the menu process of the present embodiment.

As described above, in the present embodiment, when an end of the contents is within the display area and when a scroll operation is performed in a situation where further scroll operation is unnecessary, the notification object 121 emerges and moves in accordance with the scroll operation. This allows the user to intuitively understand that the contents have arrived to an end, without the need of narrowing the area in which the contents are displayed.

Figure 19:
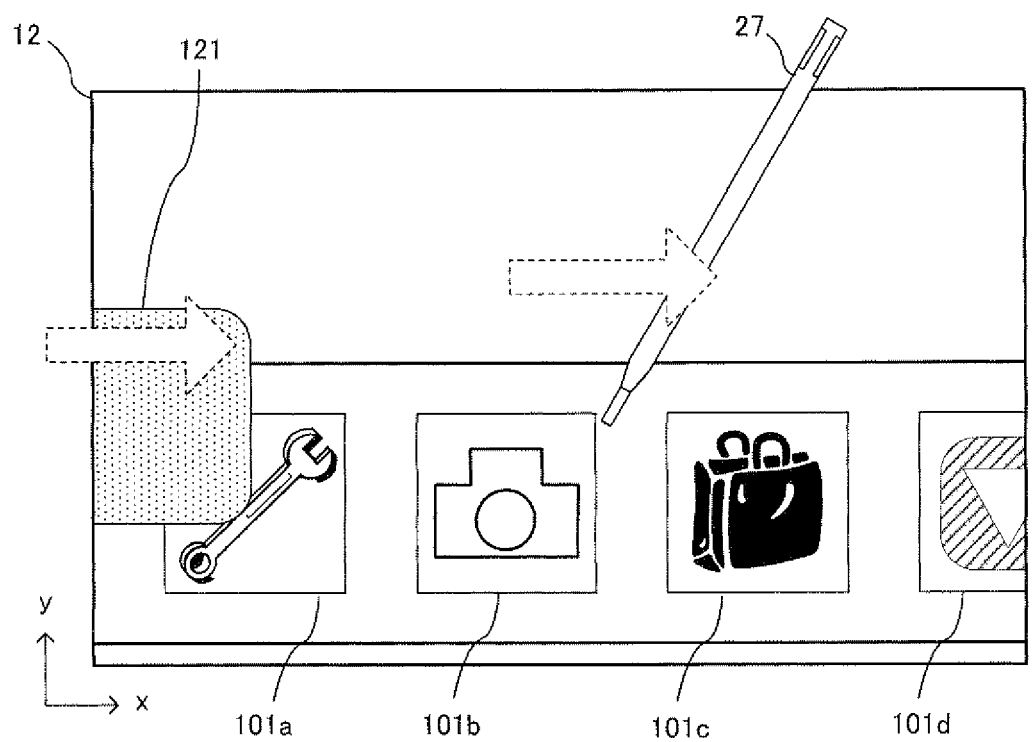
FIG. 19 is a display example of the notification object.
Figure 20:
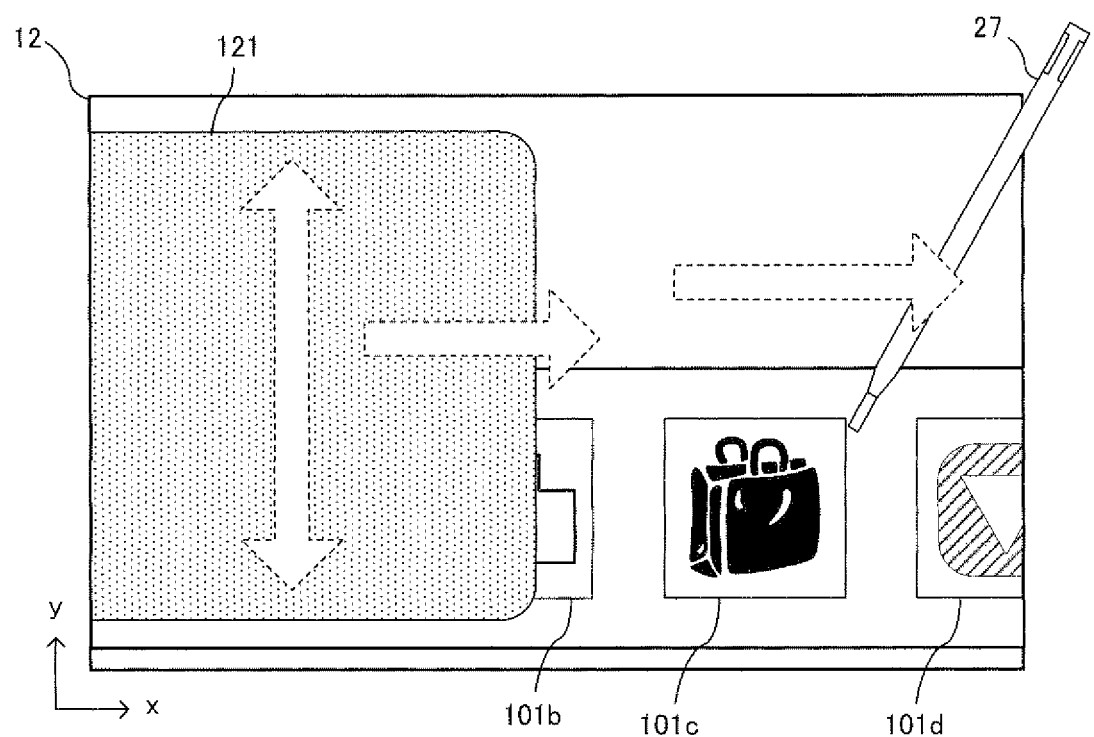
FIG. 20 is a display example of the notification object.

Note that, in the embodiment described above, used as the example for the notification object 121 is a ease where the size of the notification object 121 is fixed. Alternatively, the size of the notification object may be changed in accordance with the distance from the screen end. For example, as shown in FIG. 19 and FIG. 20, the size of the notification object 121 may be enlarged as the distance from the screen end becomes larger.

Furthermore, it is not necessarily needed to change the transparency and the size of the notification object 121, and the scroll limit representation process as described above may be conducted by having a constant transparency and size of the notification object 121.

Furthermore, in the embodiment described above, the scrolling stops at the time point when reaching an end of the contents during inertia scrolling. Other than stopping, the scroll limit representation as described above may be conducted in accordance with remaining inertia force when reaching an end of the contents. More specifically, the notification object 121 may emerge and move in accordance with remaining inertia force when reaching an end of the contents.

Furthermore, in the embodiment described above, described mainly as an example is an operation on a menu screen of a hand-held game apparatus capable of touch operation. However, the applicable apparatus of the present invention is not limit thereto, and the present invention is also applicable when scrolling contents by conducting the drag operation as described above by using a pointing device on various information processing terminals such as a stationary game apparatus, a personal computer, an electronic book reader, and the like. Other than the touch panel described above, the pointing device may be, for example: a mouse capable of pointing an arbitrary position on a screen, a tablet which is without a display screen and which is for instructing an arbitrary position on an operation surface; and a pointing device that calculates coordinates which are on a display screen and which correspond to a pointed position instructed on a display screen, the coordinates being calculated by using a position of the display screen and a marker within an image taken by pointing a device in a direction of the display screen, the device including imaging means for remotely imaging the display screen, markers arranged in the periphery of the display screen, and the like.

Furthermore, with regard to the applications and the like that can be used, as described above, various applications such as an electronic document viewer, an interne browser, and the like for browsing while scrolling contents that cannot be displayed on a single screen can be used. Alternatively, the present invention is applicable to a general situation where a list of some information, for example, an item list and the like in a game process, is displayed and where it is necessary to perform a scroll operation.

Furthermore, in the embodiment described above, horizontal scrolling is used as an example, however, the scrolling direction is not limit thereto, and the present invention is also applicable to vertical scrolling.

Furthermore, in the embodiment described above, as an example of a device for detecting a position pointed by a player in an operation area when conducting the scroll operation, the touch panel is used; however, a so-called pointing device which allows the player to instruct a position within a predetermined area may be used including examples such as: a mouse capable of pointing an arbitrary position on a screen, a tablet which is without a display screen and which is for instructing an arbitrary position on an operation surface; and a pointing device that calculates coordinates which are on a display screen and which correspond to a pointed position instructed on a display screen, the coordinates being calculated by using a position of the display screen and a marker within an image taken by pointing a device in a direction of the display screen, the device including imaging means for remotely imaging the display screen, markers arranged in the periphery of the display screen, and the like. Furthermore, instead of the pointing device, present invention is also applicable when conducting the scrolling as described above by an operation using a button such as, for example, a cross key, a cursor key, and the like. When such an operation using a button is conducted, for example, when a scroll operation is performed by holding down the left button of a cross key and when the left button is continuously held down after reaching an end of the contents, the scroll limit representation as described above will be conducted.

Furthermore, with regard to the notification object 121, in the example described above, the notification object 121 is initially arranged outside the display area as shown in FIG. 15, and then moved in the display area. As another example, the notification object 121 may be initially arranged in the virtual space at infinite distance, and then a scroll limit representation may be conducted so as to move the notification object toward the near side of the screen in accordance with the scroll operation.

Furthermore, in the embodiment described above, a case has been described where a series of processes for conducting the scroll limit representation in accordance with the scroll operation are executed on a single apparatus (the game apparatus 1). However, in another embodiment, the series of processes may be executed on an information processing system including a plurality of information processing apparatuses. For example, in an information processing system which includes a terminal side apparatus and a server side apparatus that is capable of communicating with the terminal side apparatus via a network, one part of the processes among the series of processes may be executed on the server side apparatus. Further, in an information processing system which includes a terminal side apparatus and a server side apparatus that is capable of communicating with the terminal side apparatus via a network, main processes of the series of processes may be executed on the server side apparatus, and one part of the processes may be executed on the terminal side apparatus. Still further, in the information processing system described above, the system on the server side may be configured with a plurality of information processing apparatuses, and processes to be executed on the server side may be divided to be executed by the plurality of information processing apparatuses.

While the invention has been described in detail, the foregoing description is in all aspects illustrative and not restrictive. It is understood that numerous other modifications and variations can be devised without departing from the scope of the invention.

What is claimed is:

1. A handheld portable information processing apparatus, comprising at least one processor, the at least one processor controlling the apparatus to:
   generate a display having a plurality of selection objects displayed as a list and that are selectable based on input made to the display, the list having at least a first end selection object;
   move the plurality of selection objects when an input operation is made to the display, the plurality of selection objects moving such that the plurality of selection objects in the displayed list scroll in a direction opposite to a direction of the input operation;
   detect, as the plurality of selection objects move, when the first end selection object is displayed; and
   generate, when the first end selection object is detected as being displayed, a semi-transparent notification object for display, indicative of the displayed list reaching an end of the list, that emerges from an edge of the display and moves in a direction corresponding to the direction of the input operation.

2. The information processing apparatus of claim 1, wherein the semi-transparent notification object extends in a first direction correspond to the direction of the input operation, and then retracts in a second direction corresponding to a direction opposite of the direction of the input operation.

3. The information processing apparatus of claim 1, wherein the semi-transparent notification object first increases in size in a direction corresponding to the direction of the input operation, and then decreases in size in a direction opposite to the direction of the input operation.

4. The information processing apparatus of claim 1, wherein the semi-transparent notification object is displayed while the input operation is being made to the display and then begins disappearing from display when the input operation is no longer made to the display.

5. The information processing apparatus of claim 1, wherein the plurality of selection objects move when a flick operation is performed on the display.

6. The information processing apparatus of claim 5, wherein the plurality of selection objects scroll for a period of time, after a touch-off from the flick operation, based on an inertia force corresponding to a strength of the flick operation.

7. The information processing apparatus of claim 6, wherein the semi-transparent notification object emerges and moves based on the inertia force caused by the flick operation.

8. The information processing apparatus of claim 1, wherein the semi-transparent notification object increases in size in first and second directions as the semi-transparent notification object emerges from the edge of the display and moves in the direction corresponding to the direction of the input operation.

9. The information processing apparatus of claim 1, wherein a transparency of the semi-transparent notification object changes so as to be higher as a distance from the edge of the display becomes smaller, and the transparency of the semi-transparent notification object changes so as to be lower as the distance from the edge of the display becomes larger.

10. The information processing apparatus of claim 1, wherein the semi-transparent notification object becomes more transparent when the semi-transparent notification object is closer to the edge of the display, and becomes less transparent when the semi-transparent notification object is farther from the edge of the display.

11. The information processing apparatus of claim 1, wherein the semi-transparent notification object extends in a first direction, corresponding to the direction of the input operation, while becoming less transparent, and then retracts in a second direction, corresponding to a direction opposite of the direction of the input operation, while becoming more transparent.

12. The information processing apparatus of claim 1, wherein the at least one processor further controls the apparatus to:
   calculate an amount of change in input coordinates of the input operation;
   calculate a direction of the change of the input coordinates; and
   move the semi-transparent notification object based on the calculated amount of change and the calculated direction of the change.

13. A non-transitory computer-readable storage medium having stored thereon a program executed by a computer of an information processing apparatus, the program causing the computer to provide execution comprising:
   generate a display having a plurality of selection objects displayed as a list and that are selectable based on input made to the display, the list having at least a first end selection object;
   move the plurality of selection objects when an input operation is made to the display, the plurality of selection objects moving such that the plurality of selection objects in the displayed list scroll in a direction opposite to a direction of the input operation;
   detect, as the plurality of selection objects move, when the first end selection object is displayed; and
   generate, when the first end selection object is detected as being displayed, a semi-transparent notification object for display, indicative of the displayed list reaching an end of the list, that emerges from an edge of the display and moves in a direction corresponding to the direction of the input operation.

14. The non-transitory computer-readable storage medium of claim 13, wherein the semi-transparent notification object extends in a first direction correspond to the direction of the input operation, and then retracts in a second direction corresponding to a direction opposite of the direction of the input operation.

15. The non-transitory computer-readable storage medium of claim 13, wherein the plurality of selection objects move when a flick operation is performed on the display.

16. The non-transitory computer-readable storage medium of claim 15, wherein the plurality of selection objects scroll for a period of time, after a touch-off from the flick operation, based on an inertia force corresponding to a strength of the flick operation.

17. The non-transitory computer-readable storage medium of claim 16, wherein the semi-transparent notification object emerges and moves based on the inertia force caused by the flick operation.

18. A method for generating a display, comprising:
generating a display having a plurality of selection objects displayed as a list and that are selectable based on input made to the display, the list having at least a first end selection object;
moving the plurality of selection objects when an input operation is made to the display, the plurality of selection objects moving such that the plurality of selection objects in the displayed list scroll in a direction opposite to a direction of the input operation;
detecting, as the plurality of selection objects move, when the first end selection object is displayed; and
generating, when the first end selection object is detected as being displayed, a semi-transparent notification object for display, indicative of the displayed list reaching an end of the list, that emerges from an edge of the display and moves in a direction corresponding to the direction of the input operation.

19. The method of claim 18, wherein the plurality of selection objects move when a flick operation is performed on the display.

20. The method of claim 19, wherein the plurality of selection objects scroll for a period of time, after a touch-off from the flick operation, based on an inertia force corresponding to a strength of the flick operation.

21. The method of claim 20, wherein the set, semi-transparent notification object emerges and moves based on the inertia force caused by the flick operation.

22. A system, comprising:
a processing system having at least one processor, the processing system configured to:
generate a display having a plurality of selection objects displayed as a list and that are selectable based on input made to the display, the list having at least a first end selection object;
move the plurality of selection objects when an input operation is made to the display, the plurality of selection objects moving such that the plurality of selection objects in the displayed list scroll in a direction opposite to a direction of the input operation;
detect, as the plurality of selection objects move, when the first end selection object is displayed; and
generate, when the first end selection object is detected as being displayed, a semi-transparent notification object for display, indicative of the displayed list reaching an end of the list, that emerges from an edge of the display and moves in a direction corresponding to the direction of the input operation.

* * * * *